US011970907B2

(12) United States Patent
Petitclerc

(10) Patent No.: US 11,970,907 B2
(45) Date of Patent: Apr. 30, 2024

(54) TELESCOPIC LADDER SYSTEM FOR A VEHICLE, AND SAFETY SYSTEM AND METHOD FOR SECURING AN OPERATOR ATOP A VEHICLE OR VAN

(71) Applicant: ENTREPRISE CRC (2014) INC., Québec (CA)

(72) Inventor: Keven Petitclerc, Sainte-Catherine-de-la-Jacques-Cartier (CA)

(73) Assignee: ENTREPRISE CRC (2014) INC., Quebec (CA)

( * ) Notice: Subject to any disclaimer, the term of this patent is extended or adjusted under 35 U.S.C. 154(b) by 571 days.

(21) Appl. No.: 17/095,168

(22) Filed: Nov. 11, 2020

(65) Prior Publication Data

US 2022/0145701 A1 May 12, 2022

(51) Int. Cl.

*A62B 35/00* (2006.01)
*E06C 5/06* (2006.01)
*E06C 5/24* (2006.01)

(52) U.S. Cl.

CPC ............ *E06C 5/24* (2013.01); *A62B 35/0056* (2013.01); *A62B 35/0093* (2013.01); *E06C 5/06* (2013.01)

(58) Field of Classification Search

CPC ..... E06C 5/24; E06C 5/06; E06C 5/36; E06C 7/48; E06C 7/182; E06C 7/18; E06C 5/04; E06C 5/00; E06C 7/186; E06C 7/188; E06C 1/12; A62B 35/0056; A62B 35/0093; A62B 35/0068

See application file for complete search history.

(56) References Cited

U.S. PATENT DOCUMENTS 1,529,359 A * 3/1925 Hopkins .................. E06C 5/24 182/64.1
1,899,742 A * 2/1933 Bay .......................... E06C 5/04 182/127
2,586,531 A * 2/1952 Gordon .................... E06C 5/04 182/127

(Continued)

OTHER PUBLICATIONS

VanGripper—For work performed on the top of a semi-trailer, retrieved from https://www.vangripper.com/en/#heroAccueil on Nov. 10, 2020, 1 page.

(Continued)

*Primary Examiner* — Jessica L Laux
*Assistant Examiner* — Kathleen M. McFarland
(74) *Attorney, Agent, or Firm* — BCF LLP

(57) ABSTRACT

A telescopic ladder system includes a lower base configured to be connected to a ladder-supporting portion of a vehicle, and a ladder including a base section and a fly section operatively connected to the base section and slidable relative thereto. A supporting member is disposed at a distal end of the fly section. A security railing is connected to the distal end. The ladder has an attachment point for attaching a safety line thereto. The attachment point is disposed at one of the fly section, the supporting member and the security railing. A first actuator selectively sets an inclination angle of the ladder relative to the lower base. A second actuator selectively extends the ladder by sliding the fly section relative to the base section. A safety system and a method for securing an operator atop a vehicle or van are also contemplated.

8 Claims, 19 Drawing Sheets

(56) References Cited

U.S. PATENT DOCUMENTS

| | | | | | |
|---|---|---|---|---|---|
| 2,841,960 | A * | 7/1958 | Holan | E06C 5/14 | 212/300 |
| 2,981,362 | A * | 4/1961 | Troche | E06C 5/06 | 182/2.11 |
| 3,043,398 | A * | 7/1962 | Bakula | E06C 5/04 | 182/127 |
| 3,058,607 | A * | 10/1962 | Kiley | E06C 5/24 | 414/462 |
| 3,385,398 | A * | 5/1968 | Garnett | B66F 11/046 | 182/2.11 |
| 3,396,814 | A * | 8/1968 | Garnett | B66F 11/046 | 182/2.11 |
| 3,605,943 | A * | 9/1971 | Beaudet et al. | E06C 5/04 | 182/127 |
| 3,621,935 | A * | 11/1971 | Bode | E06C 5/04 | 182/127 |
| 3,963,095 | A * | 6/1976 | Hedges | E06C 5/06 | 182/2.5 |
| 4,909,352 | A * | 3/1990 | McComb | E06C 7/42 | 182/127 |
| 6,820,723 | B2 * | 11/2004 | Huber | E06C 7/42 | 182/127 |
| 7,740,106 | B2 * | 6/2010 | Vetesnik | A62B 35/0056 | 182/180.2 |
| 7,946,387 | B2 * | 5/2011 | Betcher | A62B 35/0093 | 182/232 |
| 8,413,764 | B1 * | 4/2013 | Cohen | E06C 7/18 | 182/64.1 |
| 8,631,905 | B2 * | 1/2014 | Parrish | E06C 7/183 | 182/127 |
| 9,238,941 | B2 * | 1/2016 | Ellement | B60R 3/02 | |
| 9,272,167 | B2 * | 3/2016 | Smit | A62B 35/0043 | |
| 9,410,332 | B2 * | 8/2016 | Patton | E04G 5/001 | |
| 9,574,400 | B2 * | 2/2017 | Cox | B60D 1/66 | |
| 9,630,565 | B2 * | 4/2017 | Gallagher | E06C 5/24 | |
| 9,670,685 | B2 * | 6/2017 | Landry | A62B 35/0068 | |
| 9,677,335 | B2 * | 6/2017 | Lenz, Jr. | E06C 5/36 | |
| 9,896,884 | B2 * | 2/2018 | Salmi | E06C 5/00 | |
| 10,472,889 | B1 * | 11/2019 | Betz | E06C 5/36 | |
| 10,617,900 | B1 * | 4/2020 | Linsmeier | B66F 11/046 | |
| 10,662,040 | B2 * | 5/2020 | Svoboda | B66D 1/36 | |
| 10,676,896 | B2 * | 6/2020 | Ellement | E06C 5/02 | |
| 10,689,906 | B2 * | 6/2020 | Ziaylek | E06C 5/06 | |
| 11,065,488 | B2 * | 7/2021 | Linsmeier | B66F 11/046 | |
| 11,105,151 | B2 * | 8/2021 | Betz | E06C 5/36 | |
| 11,174,677 | B2 * | 11/2021 | Clemente | B64F 1/315 | |
| 11,414,831 | B2 * | 8/2022 | Hamano | E06C 5/06 | |
| 11,529,907 | B2 * | 12/2022 | Aswani | B66B 9/08 | |
| 2002/0166723 | A1 * | 11/2002 | Huber | E06C 7/42 | 182/127 |
| 2003/0057018 | A1 * | 3/2003 | Dodson | A62B 35/0018 | 182/3 |
| 2003/0057021 | A1 * | 3/2003 | Huber | E06C 5/02 | 182/127 |
| 2005/0247517 | A1 * | 11/2005 | Vetesnik | A62B 1/04 | 182/12 |
| 2007/0151805 | A1 * | 7/2007 | Betcher | A62B 35/0093 | 182/239 |
| 2009/0000868 | A1 * | 1/2009 | Gaines | E06C 7/482 | 182/106 |
| 2009/0038885 | A1 * | 2/2009 | Ellement | E06C 5/06 | 280/163 |
| 2010/0200328 | A1 * | 8/2010 | Savard | B66F 11/046 | 182/2.1 |
| 2012/0145480 | A1 * | 6/2012 | Willis | E06C 5/36 | 182/127 |
| 2013/0180802 | A1 * | 7/2013 | Cohen | E06C 7/186 | 182/129 |
| 2013/0233648 | A1 * | 9/2013 | Smit | A62B 35/0043 | 182/241 |
| 2014/0060967 | A1 * | 3/2014 | Patton | A62B 35/0068 | 182/3 |
| 2014/0090927 | A1 * | 4/2014 | Patton | E04G 21/3261 | 182/112 |
| 2015/0125245 | A1 * | 5/2015 | Gallagher | B60R 9/042 | 414/462 |
| 2015/0191975 | A1 * | 7/2015 | Cox | B60D 1/66 | 280/491.2 |
| 2015/0273255 | A1 * | 10/2015 | Lenz, Jr. | E06C 5/34 | 280/4 |
| 2016/0194890 | A1 * | 7/2016 | Landry | A62B 35/0068 | 248/237 |
| 2016/0215563 | A1 * | 7/2016 | Ellis | E06C 1/04 | |
| 2016/0244944 | A1 * | 8/2016 | Ellement | E06C 5/04 | |
| 2016/0303407 | A1 * | 10/2016 | Galli | A62B 35/0056 | |
| 2016/0305185 | A1 * | 10/2016 | Salmi | E06C 5/04 | |
| 2019/0233265 | A1 * | 8/2019 | Svoboda | A62B 1/10 | |
| 2019/0323292 | A1 * | 10/2019 | Ziaylek | E06C 5/04 | |
| 2020/0157884 | A1 * | 5/2020 | Clemente | E06C 5/04 | |
| 2020/0290519 | A1 * | 9/2020 | Ziaylek | B60R 9/042 | |
| 2021/0101534 | A1 * | 4/2021 | Aswani | E06C 5/44 | |
| 2021/0140141 | A1 * | 5/2021 | Hamano | B60R 3/02 | |

OTHER PUBLICATIONS

Snow Removal Machine for Trucks and Buses—Scraper Systems, retrieved from https://scrapersystems.com on Nov. 10, 2020; 7 pages.

https://www.youtube.com/watch?v=oVoCqDpsHNM&feature=youtu.be; VanGripper . . . The Safety Solution That Grips !; dated Nov. 7, 2019.

Screenshot from https://www.youtube.com/watch?v=oVoCqDpsHNM&feature=youtu.be; retrieved on Nov. 10, 2020.

* cited by examiner

TELESCOPIC LADDER SYSTEM FOR A VEHICLE, AND SAFETY SYSTEM AND METHOD FOR SECURING AN OPERATOR ATOP A VEHICLE OR VAN

FIELD OF TECHNOLOGY

The present technology relates to telescopic ladder systems for vehicles and to safety systems and methods for securing an operator atop a van.

BACKGROUND

In many applications, it can be desirable to climb atop a structure in order to operate thereon. For instance, vans used in the transport industry (sometimes referred to as "semi-trailers") and which are configured to be hauled by trucks are often maintained by an operator that climbs thereon to clean a top of the van (e.g., clearing snow therefrom). However, this can be dangerous to the operator as falling from such a height (e.g., due to a misstep or a strong gust of wind) can lead to serious injury. Therefore, properly securing the operator atop the van is important to avoid such accidents.

Some existing solutions to address this problem involve using a ladder to climb atop the van and attaching the operator to a device that grips the side of the van and is slidable longitudinally along the van. However, this requires the van to have the proper design and structure for the device to fit thereon, which may not always be the case. Furthermore, the ladder used to climb atop the van can also present hazards for the operator if it is not solidly anchored. Another solution involves not having an operator climb atop the van at all but instead using a scraper system that includes a top scraper under which a van is driven through to scrape the snow off the roof of the van. However, such scraper systems are expensive and can thus be unaffordable particularly if a size of a fleet of vans to maintain is not great enough to justify the cost of such scraper systems.

While the above problems have been described in the context of vans, these same problems can also apply for other applications, such as the maintenance of cube trucks, school buses, or even static structures such as sheds.

In view of the foregoing, there is a need for a telescopic ladder system and a safety system that addresses at least some of these drawbacks.

SUMMARY

It is an object of the present technology to ameliorate at least some of the inconveniences present in the prior art.

According to an aspect of the present technology, there is provided a telescopic ladder system for a vehicle. The telescopic ladder system comprises: a lower base configured to be connected to a ladder-supporting portion of the vehicle; a ladder comprising: a base section pivotably connected to the lower base; a fly section operatively connected to the base section and slidable relative thereto; a plurality of rungs disposed along the base section and the fly section; at least one supporting member disposed at a distal end of the fly section for supporting the distal end of the fly section on a support surface of a target structure to be climbed onto; and a security railing connected to the distal end of the fly section, the ladder having at least one attachment point for attaching a safety line thereto, the at least one attachment point being disposed at one of the fly section, the at least one supporting member and the security railing; a first actuator connected between the lower base and the base section to selectively set an inclination angle of the ladder relative to the lower base; and a second actuator connected between the base section and the fly section to selectively extend the ladder by sliding the fly section relative to the base section.

In some embodiments, the base section has two opposite side rails; and the first actuator is disposed on a lower side of the base section and is generally centered between the two opposite side rails of the base section.

In some embodiments, the telescopic ladder system of claim further comprises at least one reel connected to one of the base section and the fly section, each of the at least one reel being configured to roll and unroll the safety line.

In some embodiments, the at least one reel is disposed on an outer lateral side of the one of the base section and the fly section.

In some embodiments, the security railing comprises a first railing portion and a second railing portion extending in opposite directions from one another at the distal end of the fly section; the at least one attachment point comprises a first attachment point and a second attachment point for securing a first safety line and a second safety line thereto; and the first attachment point is disposed at the first railing portion and the second attachment point is disposed at the second railing portion.

In some embodiments, each of the first attachment point and the second attachment point comprises a loop for attaching the first safety line and the second safety line.

In some embodiments, each of the first actuator and the second actuator is a linear actuator.

In some embodiments, the telescopic ladder system further comprises: a controller in communication with the first actuator and the second actuator, the controller being operable to control the first actuator and the second actuator to selectively move the ladder.

In some embodiments, the at least one supporting member comprises an angular bracket.

In some embodiments, the at least one supporting member comprises at least two legs extending downwardly from the distal end of the fly section.

In some embodiments, a pickup truck comprises: a frame; a bed supported by the frame; and the telescopic ladder system. The base of the telescopic ladder system is connected to the frame of the pickup truck and disposed in the bed.

According to another aspect of the present technology, there is provided a method for securing an operator atop one of a vehicle and a van. The method comprises: positioning an operating vehicle in a vicinity of the one of the vehicle and the van, the operating vehicle comprising a telescopic ladder system configured to be used by the operator to climb atop the one of the vehicle and the van; extending a ladder of the telescopic ladder system approximately to a height of a top of the one of the vehicle and the van at a first longitudinal end of the one of the vehicle and the van; supporting a distal end of the ladder on a top surface of the one of the vehicle and the van at the first longitudinal end thereof to allow the operator to climb atop the one of the vehicle and the van; attaching at least one safety line to the ladder; attaching the at least one safety line to a second longitudinal end of the one of the vehicle and the van; tightening the at least one safety line by moving the ladder relative to the operating vehicle; and attaching a security harness configured to be worn by the operator to the at least one safety line.

In some embodiments, the method further comprises, prior to tightening the at least one safety line by moving the ladder, tightening the at least one safety line via a corresponding line tightening device engaging the at least one safety line at the second longitudinal end of the one of the vehicle and the van.

In some embodiments, tightening the at least one safety line by moving the ladder relative to the operating vehicle comprises changing an angular orientation of the ladder relative to the operating vehicle.

In some embodiments, changing the angular orientation of the ladder relative to the operating vehicle comprises increasing an angle defined between the ladder and a lower base of the telescopic ladder system so that the ladder is oriented to be more upright.

In some embodiments, attaching the at least one safety line to the second longitudinal end of the one of the vehicle and the van comprises: attaching the at least one safety line to a bumper of the one of the vehicle and the van at the second longitudinal end of the one of the vehicle and the van.

In some embodiments, the at least one safety line comprises a first safety line and a second safety line; the telescopic ladder system comprises a security railing disposed at the distal end of the ladder; the security railing comprises a first railing portion and a second railing portion extending in opposite directions from one another at the distal end of the ladder; attaching the at least one safety line to the ladder comprises: attaching the first safety line to the first railing portion; attaching the second safety line to the second railing portion; and attaching the at least one safety line to the bumper of the one of the vehicle and the van comprises: attaching the first safety line to the bumper of the one of the vehicle and the van at a first point of the bumper; attaching the second safety line to the bumper of the one of the vehicle and the van at a second point of the bumper laterally spaced apart from the first point of the bumper such that the first and second safety lines are generally parallel to one another.

In some embodiments, attaching the security harness to the at least one safety line comprises: attaching a first link to the first safety line and to the security harness; and attaching a second link to the second safety line and to the security harness, the security harness being restricted within a range of lateral movement relative to the one of the vehicle and the van by the first and second links.

In some embodiments, attaching the first link to the first safety line comprises attaching a first hook of the first link to the first safety line; attaching the second link to the second safety line comprises attaching a second hook of the second link to the second safety line; and the security harness is free to be moved longitudinally along the one of the vehicle and the van as the first and second hooks slide along the first and second safety lines.

According to another aspect of the present technology, there is provided a safety system for securing an operator atop one of a vehicle and a van. The one of the vehicle and the van has a first longitudinal end and a second longitudinal end. The safety system comprises: an operating vehicle comprising a telescopic ladder system, the telescopic ladder system comprising: a lower base connected to a ladder-supporting portion of the operating vehicle; a ladder comprising: a base section pivotably connected to the lower base; a fly section operatively connected to the base section and slidable relative thereto; a plurality of steps disposed along the base section and the fly section; at least one supporting member disposed at a distal end of the fly section for supporting the distal end of the fly section on a top surface of the one of the vehicle and the van at the first longitudinal end of the one of the vehicle and the van; and a security railing connected to the distal end of the fly section, the ladder having at least one safety line attachment point, the at least one safety line attachment point being disposed at one of the fly section, the at least one supporting member and the security railing; a first actuator connected between the lower base and the base section to selectively set an inclination angle of the ladder relative to the lower base; and a second actuator connected between the base section and the fly section to selectively extend the ladder by sliding the fly section relative to the base section. The safety system also comprises at least one safety line attached to: the at least one safety line attachment point; and the second longitudinal end of the one of the vehicle and the van, the at least one safety line extending longitudinally along the one of the vehicle and the van. The safety system also comprises at least one link connected to the at least one safety line, the at least one link being configured to be connected to a security harness to be worn by the operator so as restrict the operator within a range of lateral movement relative to the one of the vehicle and the van.

In some embodiments, the at least one safety line comprises a first safety line and a second safety line; the security railing comprises a first railing portion and a second railing portion extending in opposite directions from one another at the distal end of the fly section; the at least one safety line attachment point comprises a first safety line attachment point disposed at the first railing portion and a second safety line attachment point disposed at the second railing portion; the one of the vehicle and the van comprises a bumper disposed at the second longitudinal end thereof; the first safety line is attached to: the first railing portion via the first safety line attachment point; and the bumper of the one of the vehicle and the van at a first point of the bumper; and the second safety line is attached to: the second railing portion via the second safety line attachment point; and the bumper of the one of the vehicle and the van at a second point of the bumper laterally spaced apart from the first point of the bumper such that the first and second safety lines are generally parallel to one another.

In some embodiments, the first link comprises a first hook, the first hook connecting the first link to the first safety line; and the second link comprises a second hook, the second hook connecting the second link to the second safety line, the first and second hooks being slidable along the first and second safety lines to allow free movement of the operator longitudinally along the one of the vehicle and the van.

In some embodiments, the telescopic ladder system further comprises: a controller in communication with the first actuator and the second actuator, the controller being operable to control the first actuator and the second actuator to selectively move the ladder.

Embodiments of the present technology each have at least one of the above-mentioned objects and/or aspects, but do not necessarily have all of them. It should be understood that some aspects of the present technology that have resulted from attempting to attain the above-mentioned objects may not satisfy these objects and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
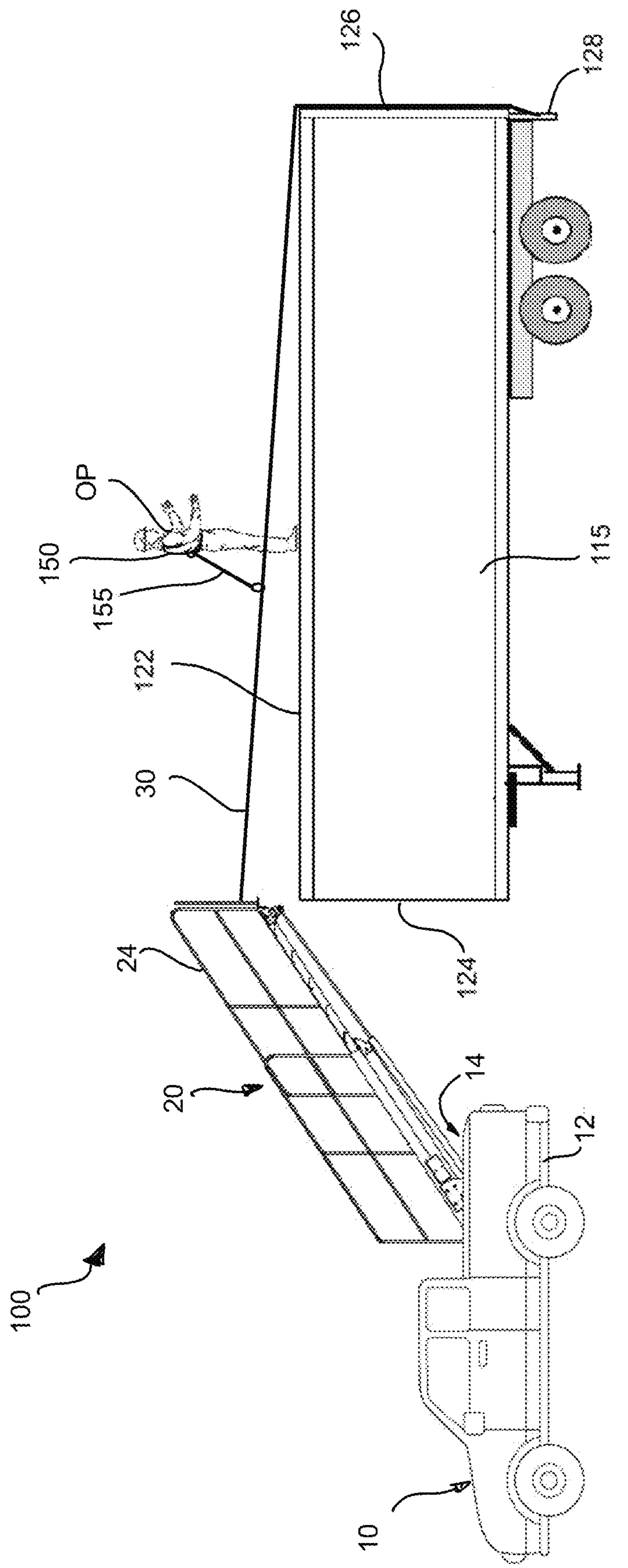
FIG. 1 is a left side elevation view of a safety system for securing an operator atop a van according to one embodiment of the present technology.
Figure 2:
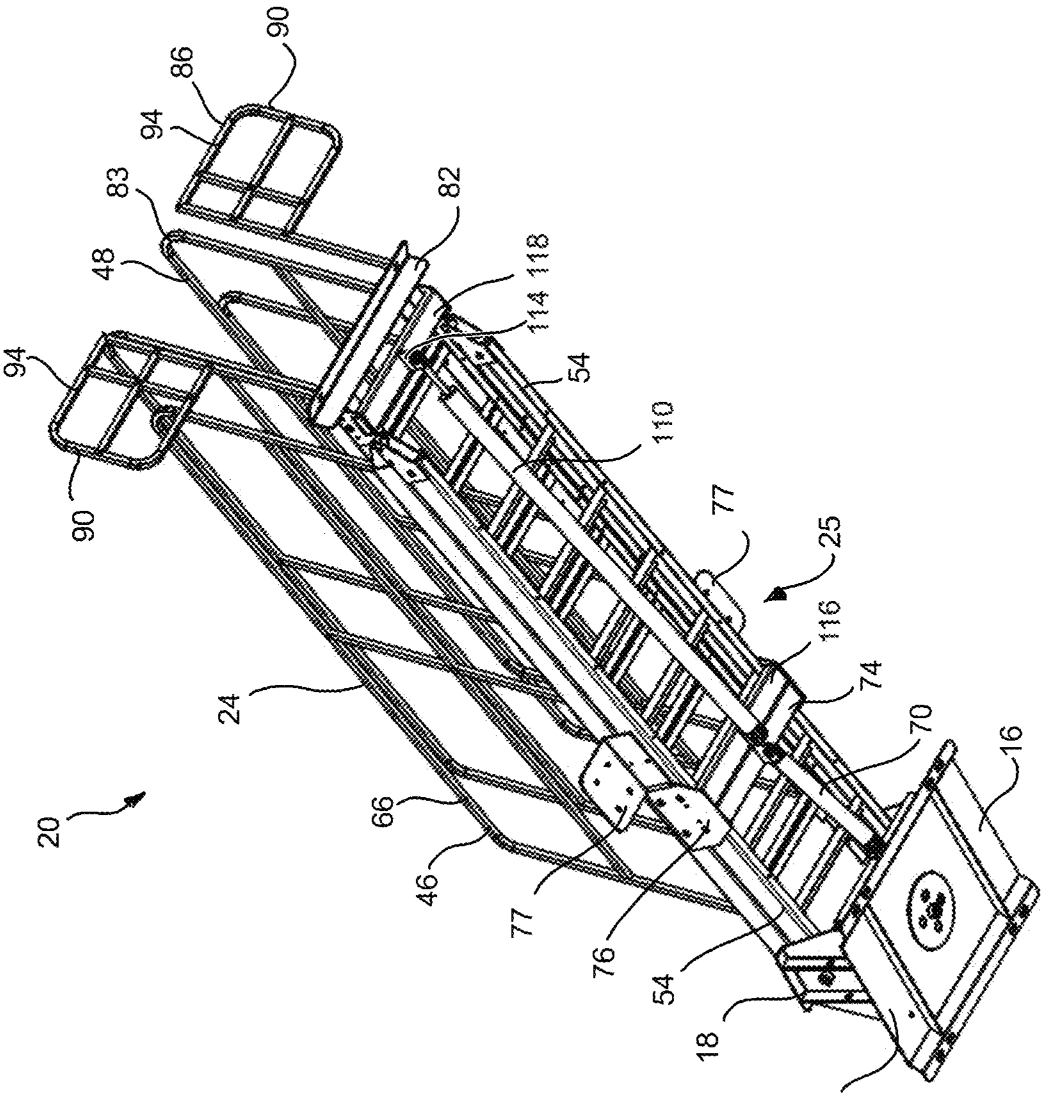
FIG. 2 is a perspective view, taken from a bottom, left side, of a telescopic ladder system according to one embodiment of the present technology, showing a ladder thereof in a retracted state.

A safety system 100 for securing an operator OP atop a van 115 is shown in FIG. 1. The safety system 100 allows the operator OP to climb atop the van 115 and safely operate on a roof 122 of the van 115, such as cleaning the roof 122 of the van 115 (e.g., clearing snow therefrom). In particular, as will be described below, the safety system 100 prevents the operator OP from accidentally falling off the roof 122 of the van 115 which could lead to serious injury. As shown in FIG. 1, in this embodiment, the van 115 is an enclosed wagon of the type used in the transport industry, namely being configured to be hauled by a truck. Such vans can sometimes be referred to as "semi-trailers". The van 115 has two opposite longitudinal ends 124, 126, namely a front longitudinal end 124 and a rear longitudinal end 126. A length of the van 115 is measured between the front longitudinal end 126 and the rear longitudinal end 126. In this embodiment, the length of the van 115 is approximately 50 feet. The length of the van 115 may be different in other embodiments.

In this embodiment, the safety system 100 includes an operating vehicle 10 including a telescopic ladder system 20, and two safety lines 30 attached between the telescopic ladder system 20 and the van 115. As can be seen, in this embodiment, the operating vehicle 10 is a pickup truck. The pickup truck 10 has a frame 12 and a bed 14 supported by the frame 12. The bed 14 can be used to carry cargo (e.g., equipment) and, in this embodiment, houses in part the telescopic ladder system 20.

Figure 4:
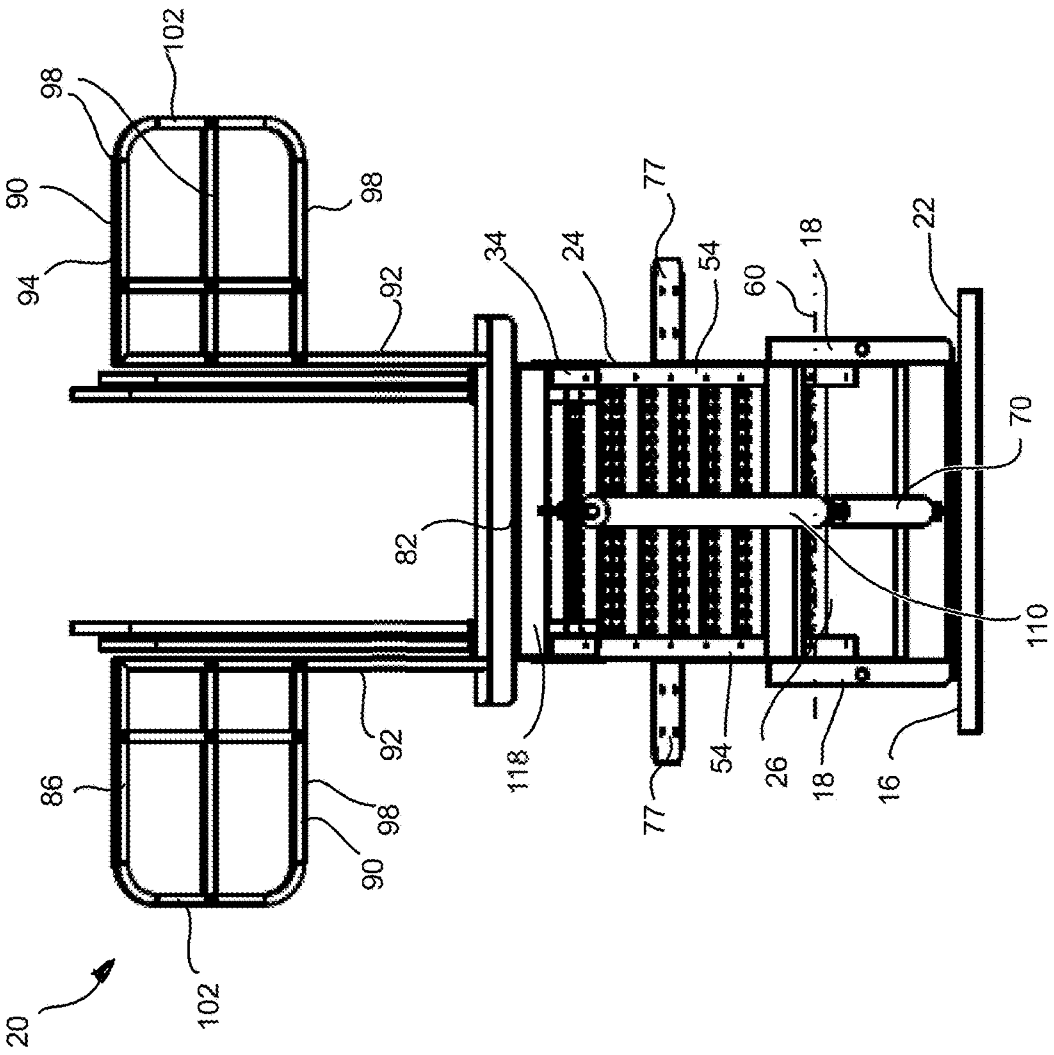
FIG. 4 is a rear elevation view of the telescopic ladder system of FIG. 2.
Figure 5:
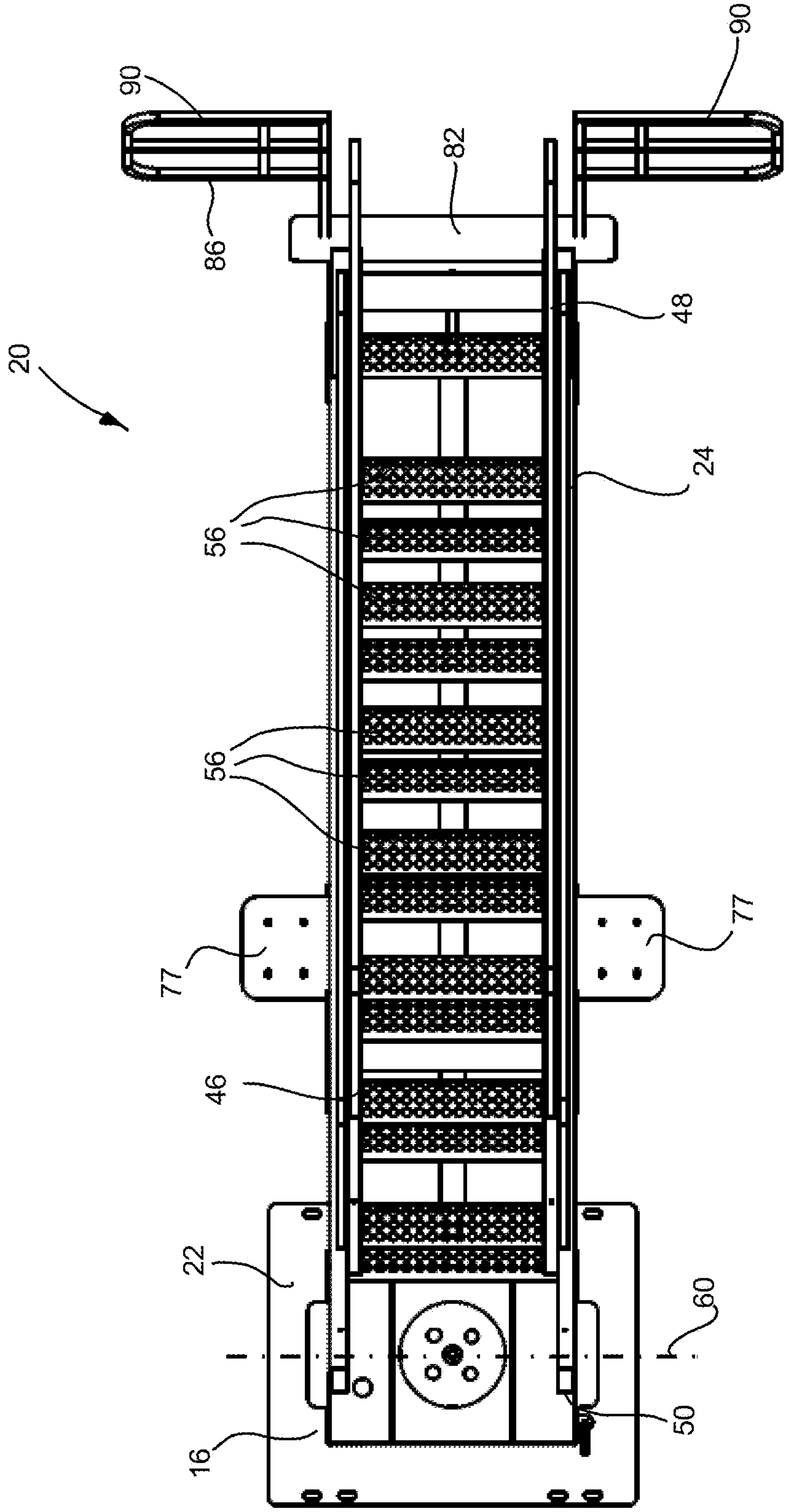
FIG. 5 is a top plan view of the telescopic ladder system of FIG. 2.
Figure 6:
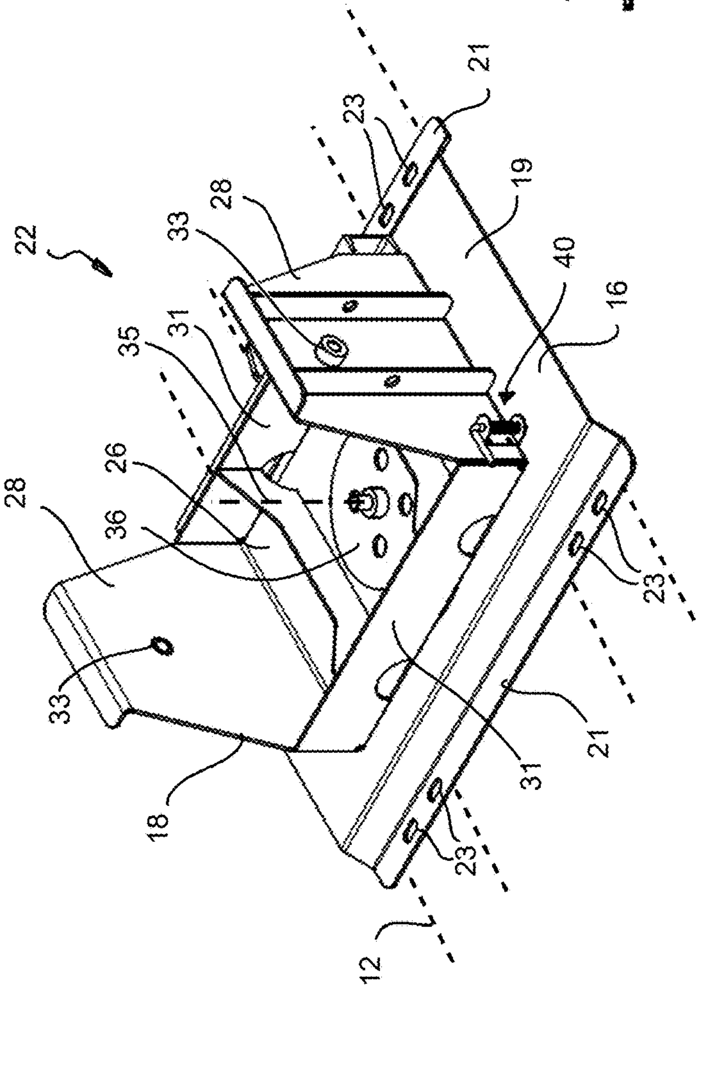
FIG. 6 is a perspective view, taken from a front, left side, of a lower base of the telescopic ladder system of FIG. 2.
Figure 7:
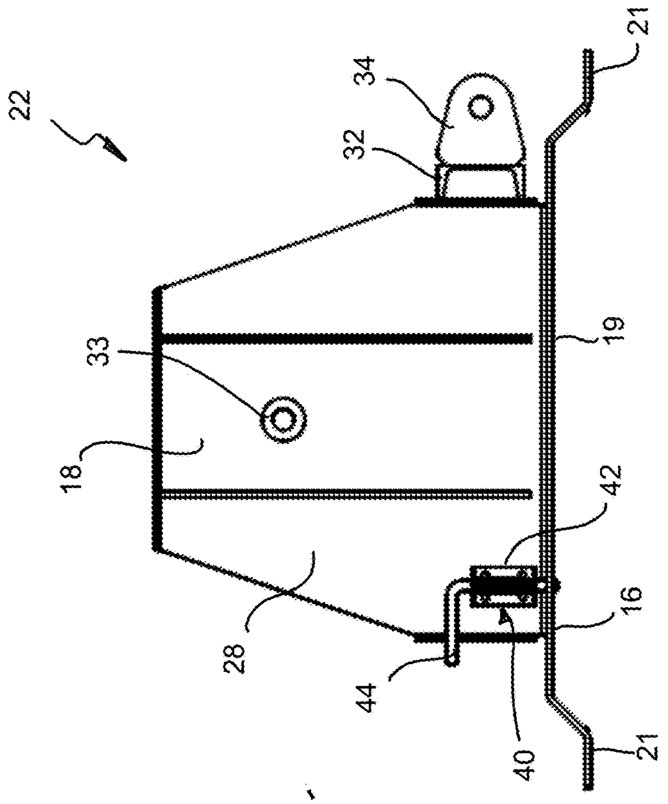
FIG. 7 is a left side elevation view of the lower base of FIG. 6.

With reference to FIGS. 2 to 11, the telescopic ladder system 20 includes a lower base 22 and a ladder 24 connected to the lower base 22. The lower base 22 is connected to a portion of the frame 12 of the pickup truck 10 and is disposed in the bed 14 thereof. The portion of the frame 12 to which the lower base 22 is connected may thus be referred to as a ladder-supporting portion thereof. As best shown in FIGS. 6 and 7, the lower base 22 includes a platform 16 and an upper base portion 18 connected to and extending upwardly from the platform 16. The platform 16 extends generally horizontally and has an elevated portion 19 and two flanges 21 on opposite ends of the elevated portion 19. The two flanges 21 are disposed vertically lower than the elevated portion 19. Each of the two flanges 21 defines a plurality of openings 23 configured to receive fasteners for connecting the platform 16 (and thus the lower base 22) to the frame 12 of the pickup truck 10 (shown exemplarily in dashed lines in FIG. 6). The upper base portion 18 includes a lower wall 26 extending generally horizontally (parallel to the elevated portion 19 of the platform 16), two lateral side walls 28 spaced apart from one another and two front and rear walls 31 spaced apart from one another. The lateral side walls 28 and the front and rear walls 31 extend upwardly and perpendicularly from the lower wall 26. The lateral side walls 28 are connected to and are perpendicular to the front and rear walls 31. Two bearings 33 (e.g., bushings) are mounted in respective openings defined by the lateral side walls 28. As will be described in more detail below, the two bearings 33 are configured to form a pivoting connection with the ladder 24. As shown in FIG. 7, a support bracket 32 is connected to the rear wall 31 and supports an actuator support flange 34 connected thereto. The actuator support flange 34 is disposed centrally along the rear wall 31 (see FIG. 4).

In this embodiment, as shown in FIG. 6, the upper base portion 18 is pivotably connected to the platform 16 about a base pivot axis 35 extending generally vertically. This may be useful to allow greater versatility in the positioning of the pickup truck 10 relative to the van 115. In particular, a pivot 36 defining the base pivot axis 35 interconnects the lower wall 26 of the upper base portion 18 to the elevated portion 19 of the platform 16. In this embodiment, the pivot 36 includes an actuator coupling 38 configured to be connected to a base actuator 37 (schematically illustrated in FIG. 12) that causes rotation of the upper base portion 18 relative to the platform 16 about the base pivot axis 35. For instance, in this embodiment, the base actuator 37 is a motor. The upper base portion 18 is also lockable in a locked position relative to the platform 16 (shown in FIGS. 6 and 7) by a lock 40 connected to one of the lateral side walls 28. The lock 40 includes a lock support 42 and a locking hitch pin 42 that is received in and slidable relative to the lock support 42. The lock support 42 is fastened to the left lateral side wall 28 and includes a sleeve within which part of the L-shaped locking hitch pin 42 is received. A lock opening (not shown) is defined by the elevated portion 19 of the platform 16 and receives the locking hitch pin 42 to lock the upper base portion 18 relative to the platform 16. In the locked position, the lateral side walls 28 are generally parallel to a longitudinal direction of the pickup truck 10 (i.e., the lateral side walls 28 extend generally longitudinally) such that the ladder 24 extends generally longitudinally.

It is contemplated that, in alternative embodiments, the upper base portion 18 may not be pivotable relative to the platform 16. For instance, in such embodiments, the upper base portion 18 could be welded or otherwise fastened to the platform 16 and the pivot 36 could be omitted. The upper base portion 18 may thus be permanently positioned relative to the platform 16 as illustrated in FIGS. 6 and 7 (i.e., in the locked position).

As will be understood, the anchoring of the lower base 22 to the pickup truck 10 provides a secure way to climb onto the van 115 as the ladder 24 is properly supported and does not need to be held by a helper while the operator OP climbs thereon.

Figure 8:
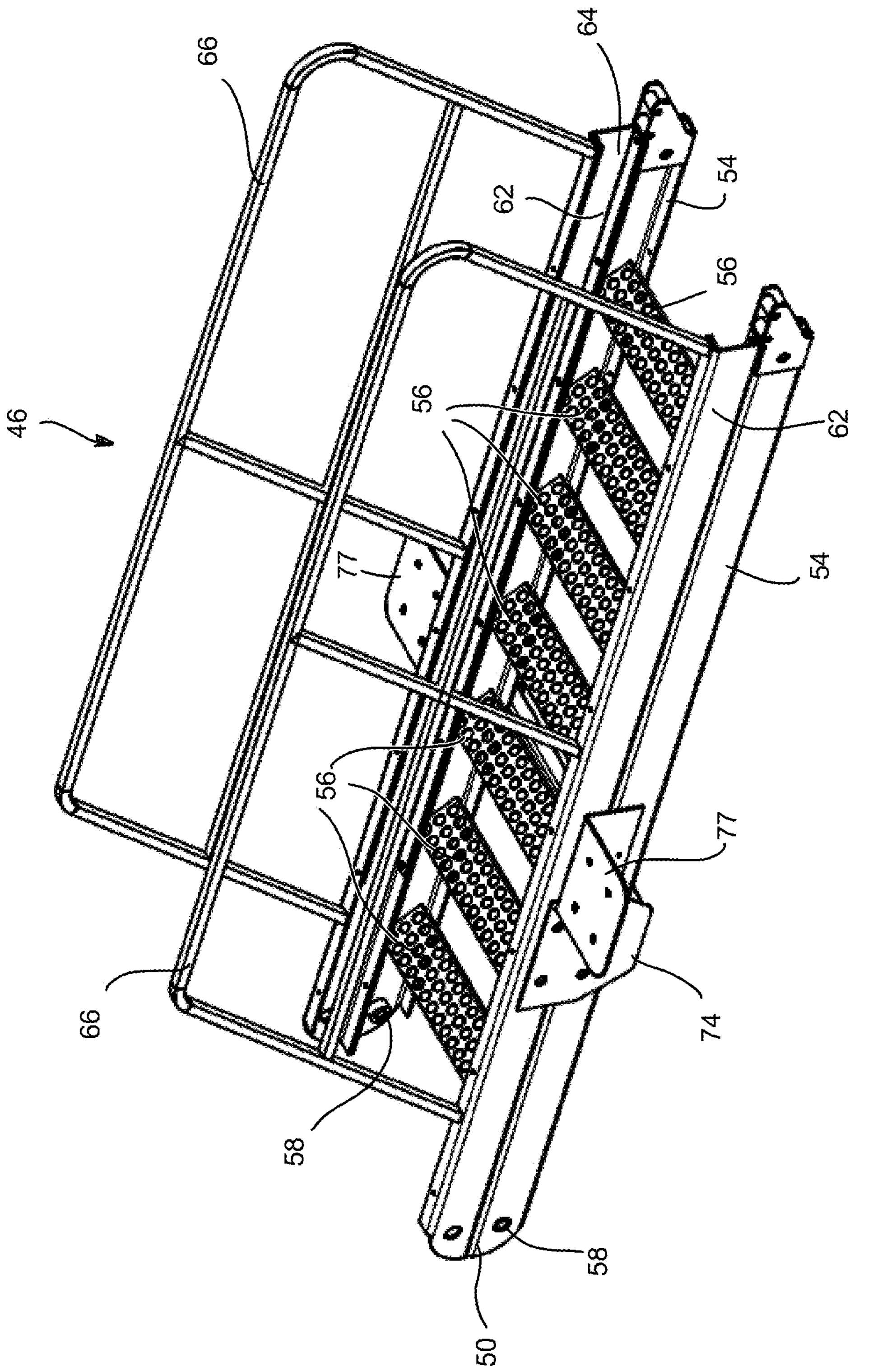
FIG. 8 is a perspective view, taken from a distal side, of a base section of the ladder of the telescopic ladder system of FIG. 2.
Figure 9:
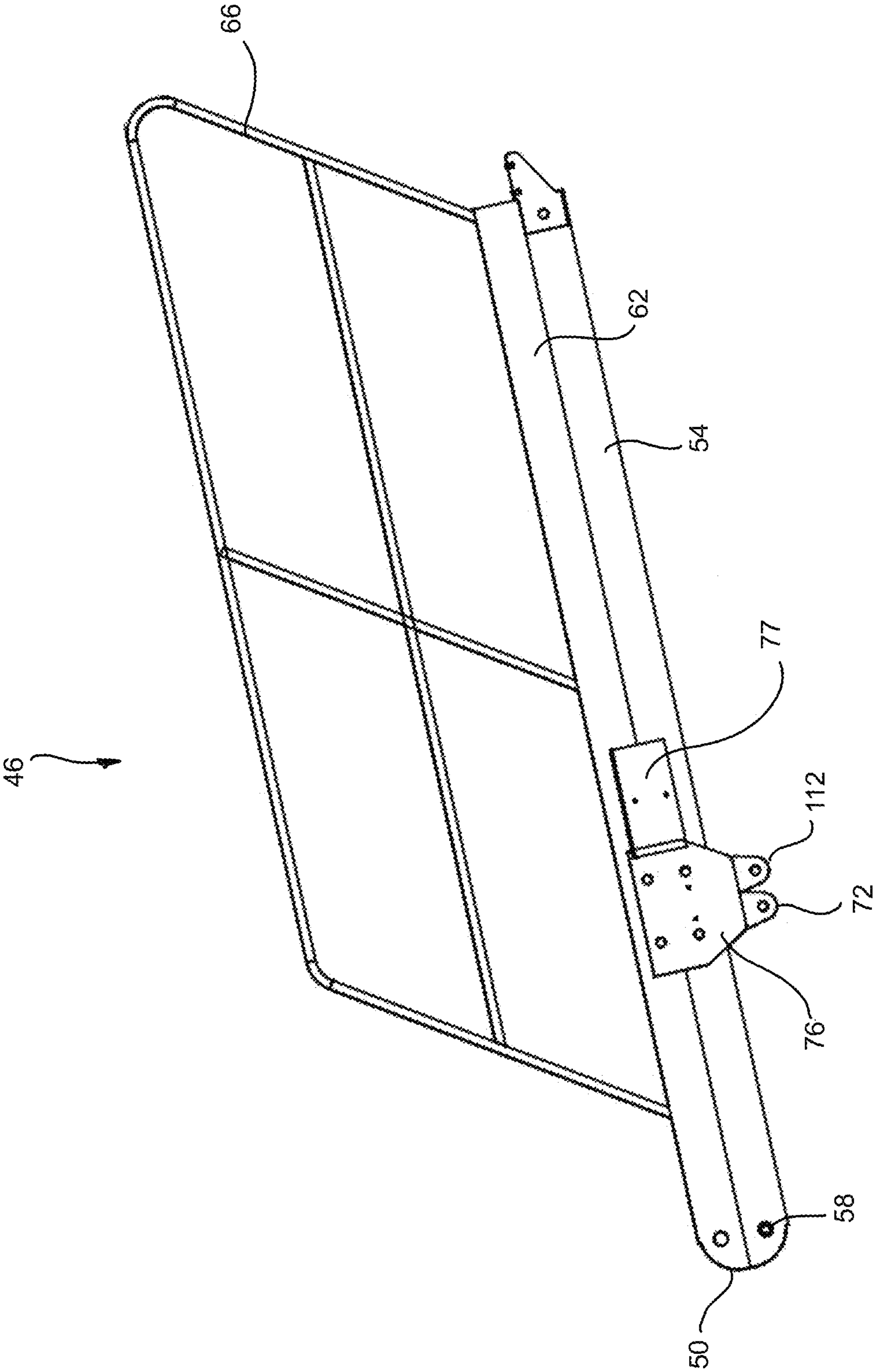
FIG. 9 is a left side elevation view of the base section of FIG. 8.

Returning now to FIGS. 2 to 5, the ladder 24 has two separate ladder sections, namely a base section 46 and a fly section 48 which are operatively connected to one another. More specifically, as will be described in more detail below, the base and fly sections 46, 48 are slidable relative to one another. The base section 46 defines a proximal end 50 of the ladder 24 and the fly section 48 defines a distal end 52 of the ladder 24. As shown in FIGS. 8 and 9, the base section 46 has two elongated side rails 54 that are parallel and opposite to one another, and a plurality of rungs 56 disposed between and interconnecting the two side rails 54. The rungs 56 are crosspieces for a person to step on while climbing the ladder 24. The side rails 54 define, at their proximal ends (defining the proximal end 50 of the ladder 24), respective pivot mounts 58 that are coaxial with one another. Each of the pivot mounts 58 comprises a bearing (e.g., a bushing). The base section 46 is pivotably connected to the lateral side walls 28 of the lower base 22 via the pivot mounts 58. Notably, the proximal end of the base section 46 is disposed between the two lateral side walls 28 and a shaft (not shown) extends through the bearings 33 mounted to the lateral side walls 28 and through the pivot mounts 58 of the base section 46. As such, the base section 46 (and therefore the ladder 24) is pivotably connected to the lower base 22 about a ladder pivot axis 60 (FIG. 5) defined by the pivot mounts 58.

With continued reference to FIG. 8, the base section 46 also has two slide channel members 62, each of which is connected to a respective one of the side rails 54. The slide channel members 62 are elongated and extend parallel to the side rails 54. In particular, the slide channel members 62 are disposed above the side rails 54. The slide channel members 62 may be fastened to the side rails 54 in any suitable way. In this embodiment, the slide channel members 62 are welded to the side rails 54. Each of the slide channel members 62 has a generally C-shaped cross-section and defines a channel 64 for interacting with the distal ladder portion 48. Left and right guard rails 66 are connected to the left and right slide channel members 62 respectively, on an upper side thereof such that the guard rails 66 are disposed on an upper side 27 of the ladder 24. The guard rails 66 are provided for the operator OP to hold onto while climbing the ladder 24.

In this embodiment, two reels 75 (one of which is shown in dashed lines in FIG. 3) are connected to the base section 46 of the ladder 24. Notably, the reels 75 are disposed on the outer lateral sides of the base section 46. In particular, each of the reels 75 is connected to a reel supporting member 77 that is generally L-shaped and connected to the side rails 80 and the slide channel members 62, on the outer lateral side thereof. The reels 75 are configured to roll and unroll a corresponding one of the safety lines 30. More specifically, in this embodiment, the safety lines 30 are stored on the reels 75 when the safety lines 30 are not in use. The safety lines 30 can then be unrolled by to be used in the context of the safety system 100. In this embodiment, the safety lines 30 are safety ropes.

It is contemplated that the reels 75 could be disposed at different locations along the ladder 24 in other embodiments. For instance, in the alternative embodiment shown in FIGS. 16 to 19, the reels 75 are connected to the fly section 48, near the distal end 84. It is contemplated that, in other embodiments, the safety lines 30 could remain attached to the reels 75 when being deployed. In such embodiments, the attachment points 104 for the safety lines 30 are defined by the reels 75.

Figure 3:
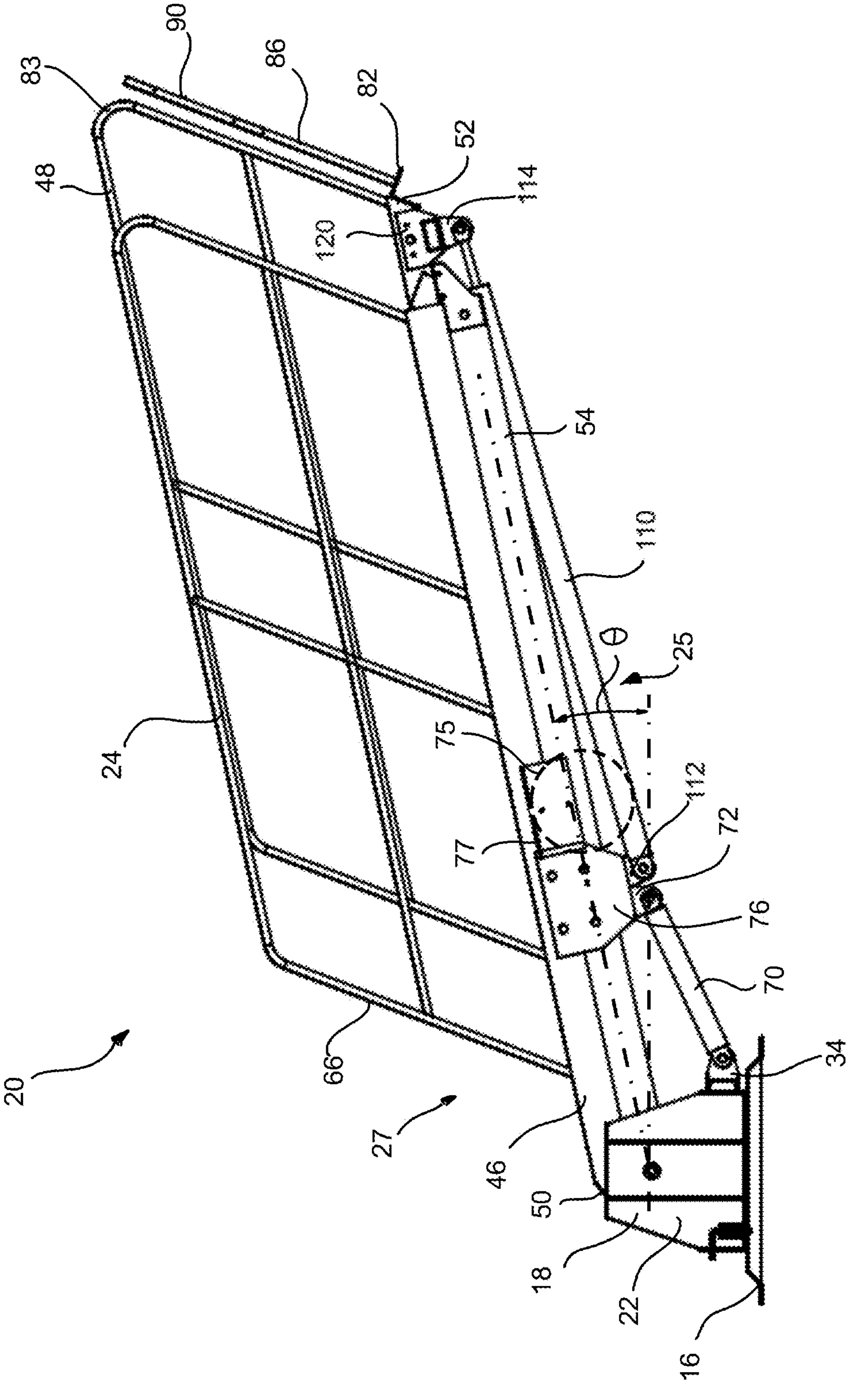
FIG. 3 is a left side elevation view of the telescopic ladder system of FIG. 2.

Returning now to FIGS. 2 and 3, a pivot actuator 70 is disposed on a lower side 25 of the ladder 24 (and more specifically on a lower side of the base section 46) and is connected between the base section 46 and the lower base 22. The pivot actuator 70 is configured to cause the base section 46, and thereby the ladder 24, to pivot about the ladder pivot axis 60 (FIG. 5). In this embodiment, the pivot actuator 70 is a linear actuator, and more specifically a hydraulic linear actuator. As best shown in FIG. 3, the pivot actuator 70 is connected, at a proximal end thereof, to the actuator support flange 34 and, at a distal end thereof, to another actuator support flange 72. The actuator support flange 72 is connected to the side rails 54 via a transverse support member 74 and left and right connector plates 76 (the left connector plate 76 being shown in FIGS. 8 and 9). In particular, the actuator support flange 72 is connected to a lower surface of the transverse support member 74, which is elongated and extends perpendicular to the side rails 54, while the left and right ends of the transverse support member 74 are connected to the left and right connector plates 76 respectively. In turn, the connector plates 76 are connected to the side rails 54 and to the slide channel members 62 such that the side rails 54 and the slide channel members 62 are disposed between the two connector plates 76. As can be seen in FIG. 4, the pivot actuator 70 is generally centered between the two opposite side rails 54 of the base section 46.

Figure 13:
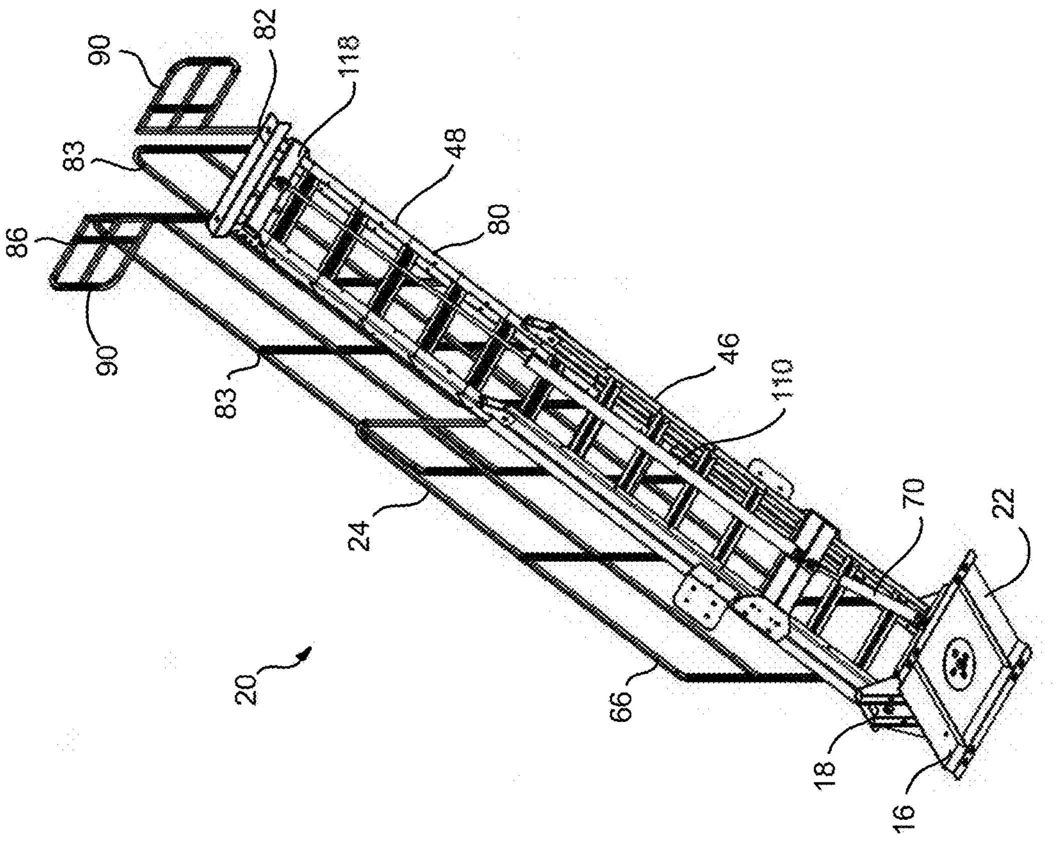
FIG. 13 is a perspective view, taken from a bottom, left side, of the telescopic ladder system of FIG. 2, showing the ladder in an extended state.
Figure 14:
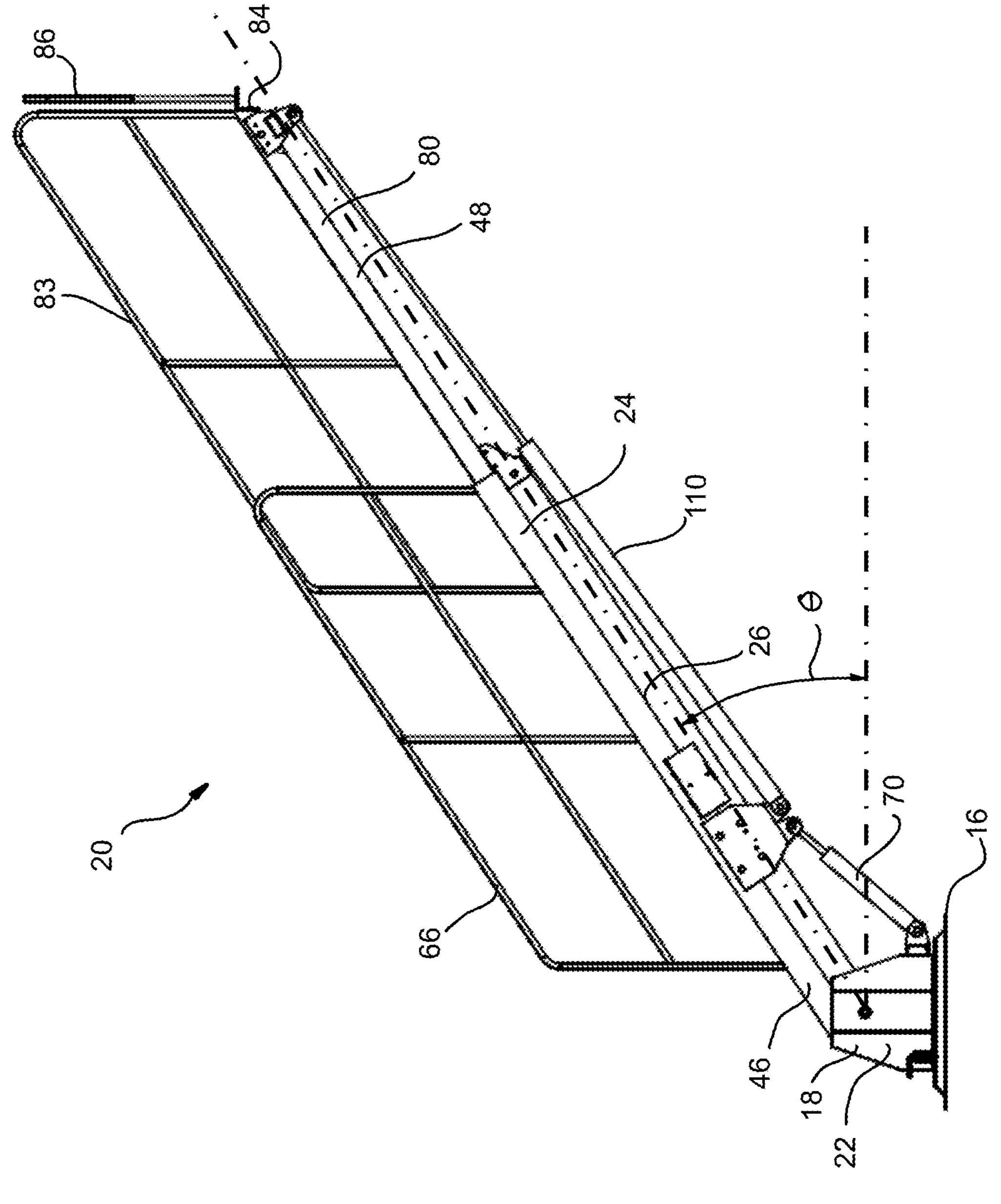
FIG. 14 is a left side elevation view of the telescopic ladder system of FIG. 13.
Figure 15:
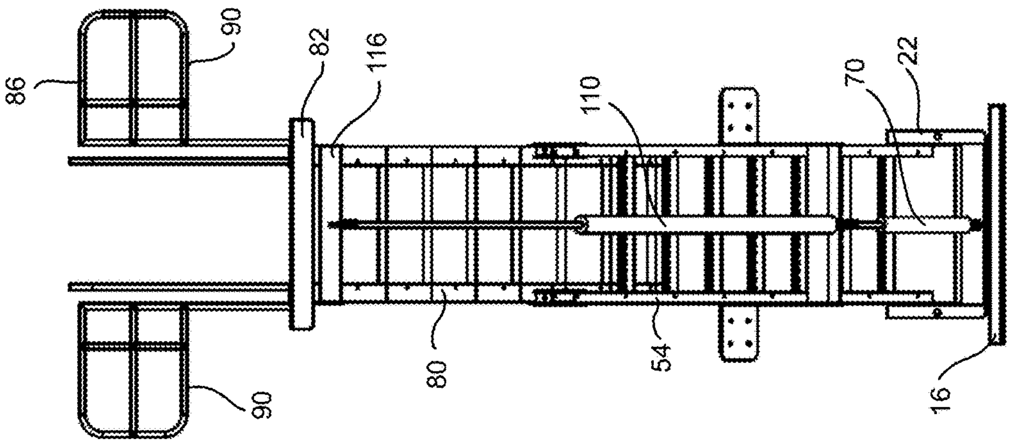
FIG. 15 is a rear elevation view of the telescopic ladder system of FIG. 13.
Figure 16:
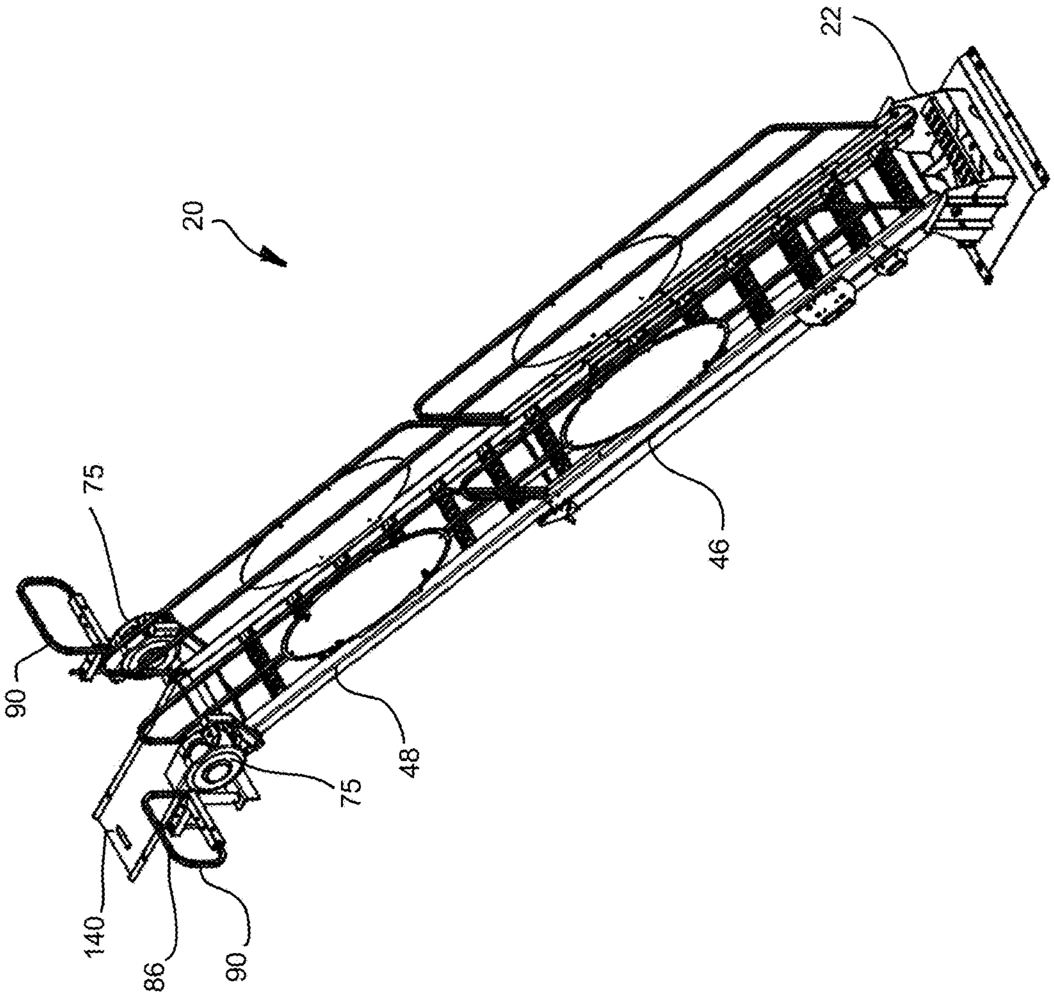
FIG. 16 is a perspective view, taken from a front, right side, of the telescopic ladder system according to an alternative embodiment of the present technology.
Figure 18:
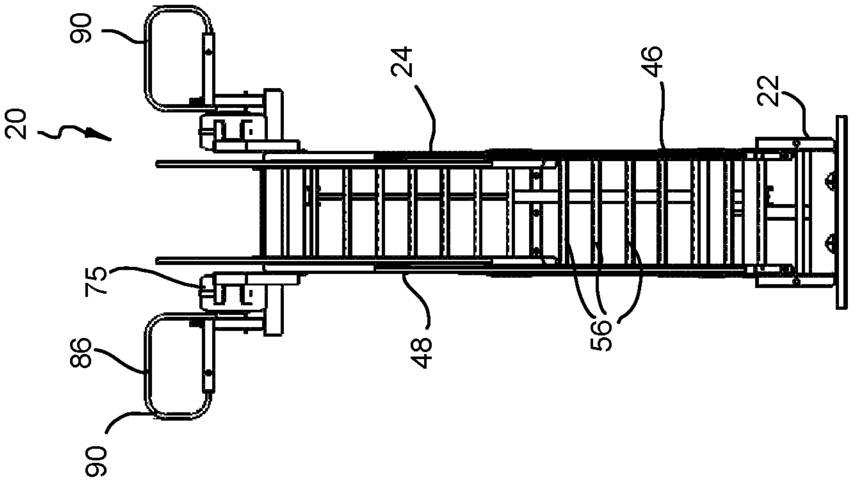
FIG. 18 is a rear elevation view of the telescopic ladder system of FIG. 16.
Figure 17:
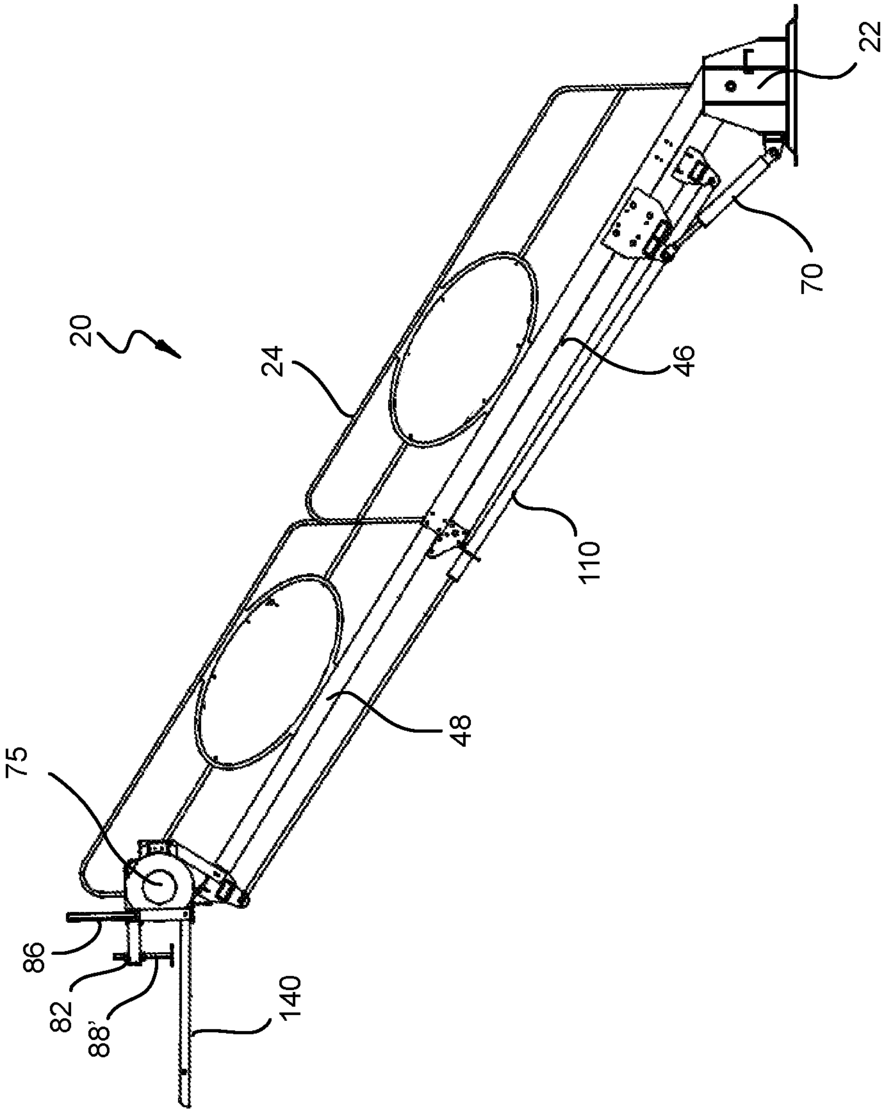
FIG. 17 is a right side elevation view of the telescopic ladder system of FIG. 16.
Figure 19:
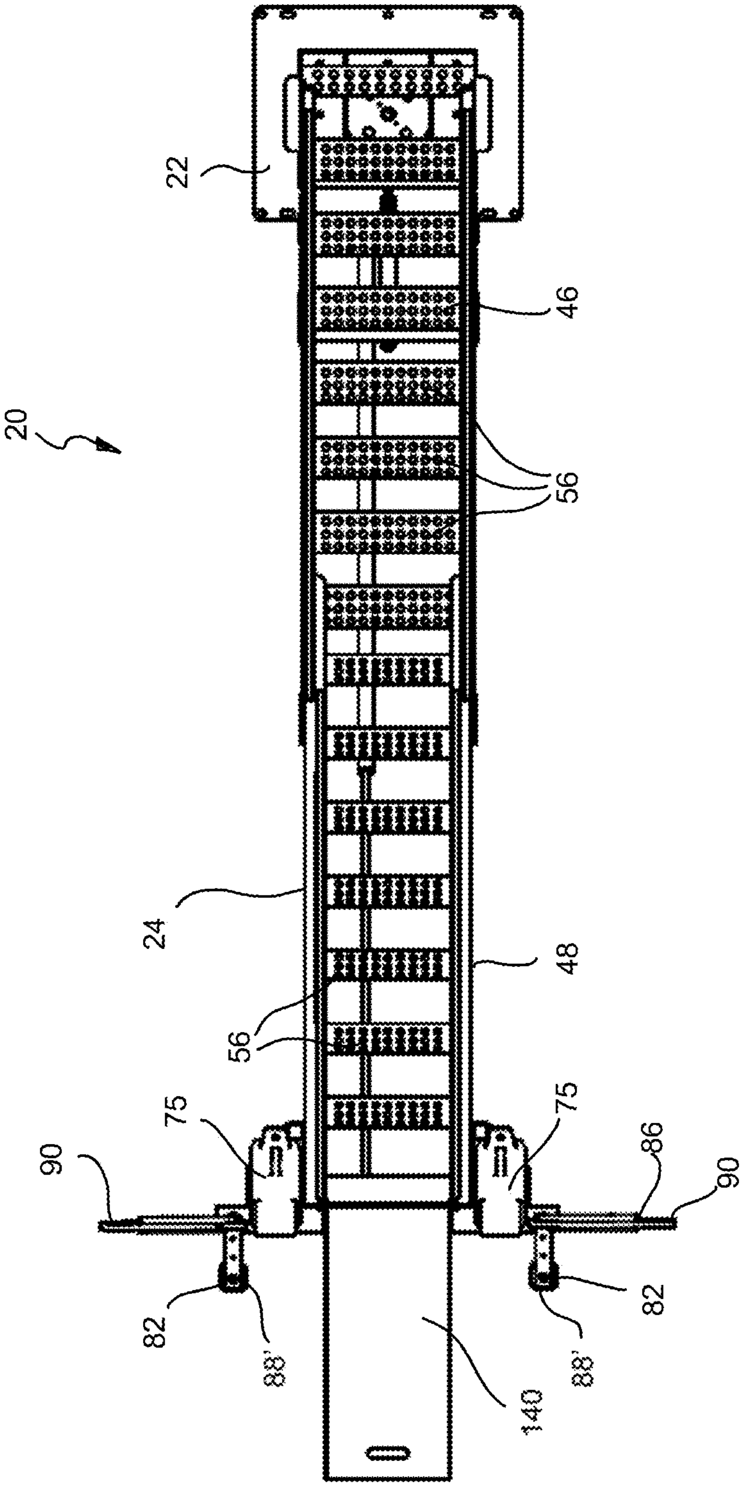
FIG. 19 is a top plan view of the telescopic ladder system of FIG. 16.

Thus, with reference to FIG. 3, by extending and retracting the pivot actuator 70, the pivot actuator 70 can selectively set an inclination angle $\theta$ of the ladder 24 relative to the lower base 22. For instance, the inclination angle $\theta$ can be measured between a plane generally parallel to the side rails 54 and a plane parallel to the platform 16 of the lower base 22 (i.e., a generally horizontal plane). By retracting the pivot actuator 70 to its maximum retracted position, as shown in FIGS. 2 to 5, the ladder 24 is set to a lowest pivot position corresponding to the lowest value of the inclination angle $\theta$. Contrarily, by extending the pivot actuator 70 to its maximum extended position, the ladder 24 is set to its highest pivot position corresponding to the highest value of the inclination angle $\theta$. For example, FIGS. 13 to 15 show the ladder 24 in a position intermediate between the lowest and highest pivot positions thereof, suitable for the operator OP to climb atop the van 115.

Figure 10:
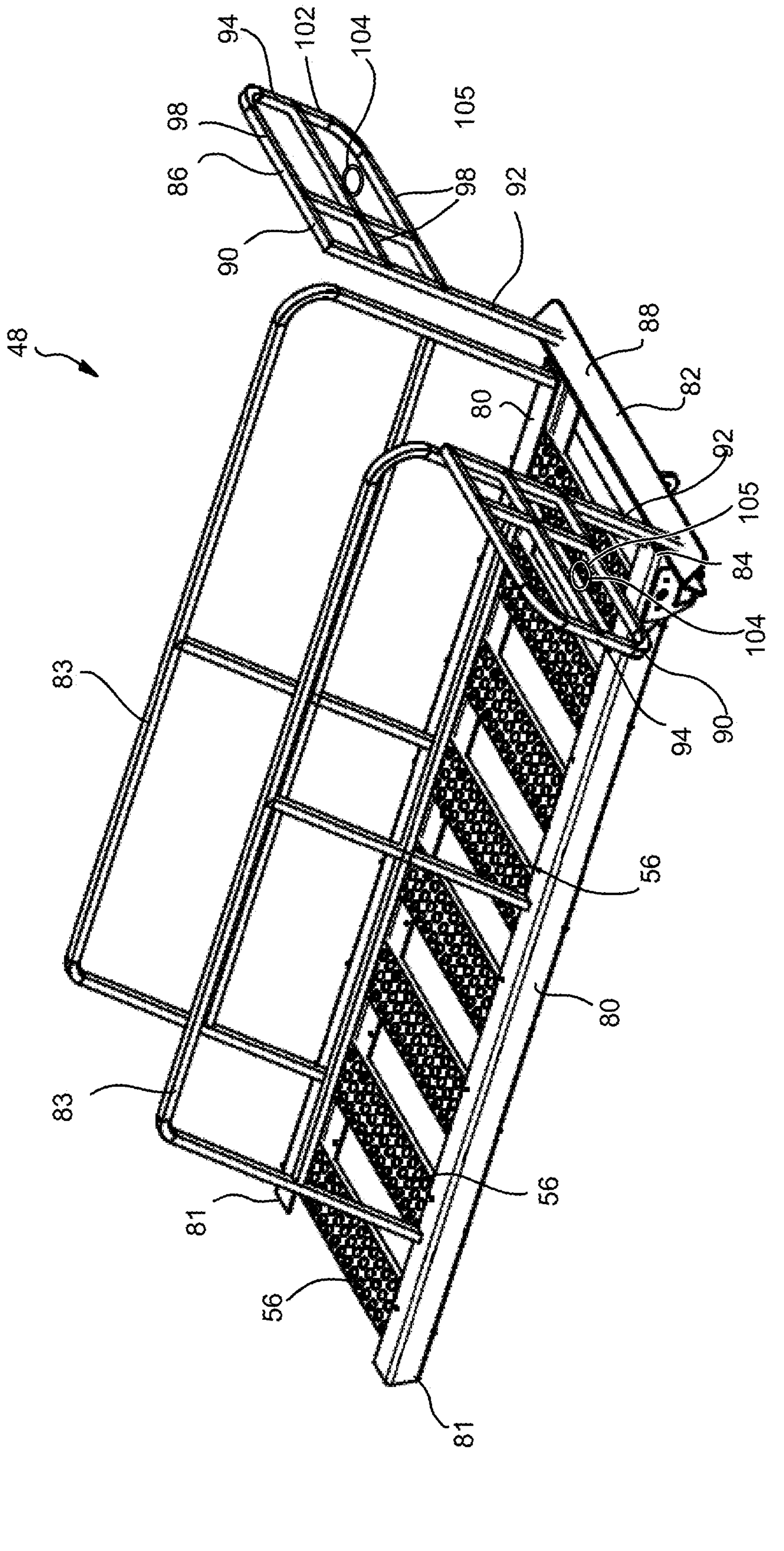
FIG. 10 is a perspective view, taken from a distal side, of a fly section of the ladder of the telescopic ladder system of FIG. 2.
Figure 11:
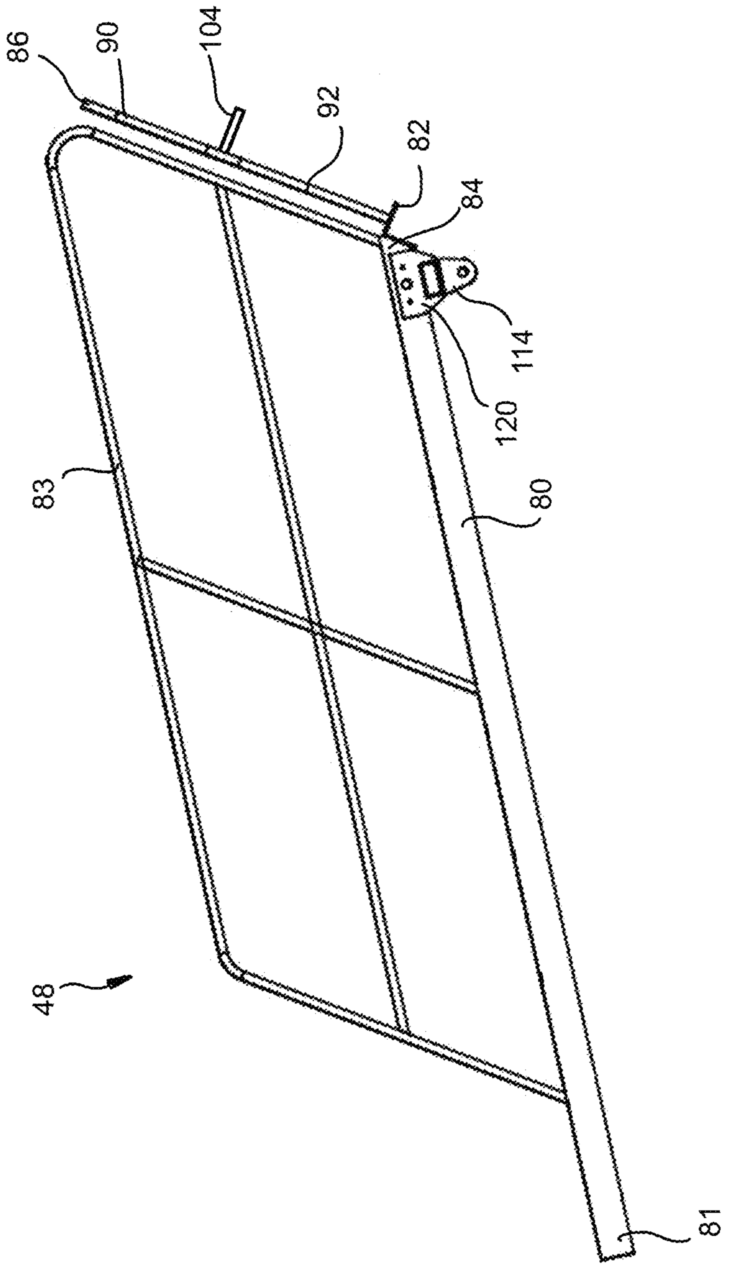
FIG. 11 is a left side elevation view of the fly section of FIG. 10.

With reference now to FIGS. 10 and 11, the fly section 48 of the ladder 24 has two elongated side rails 80 that are parallel and opposite to one another. The side rails 80 have proximal and distal ends 81, 84 which correspond to proximal and distal ends of the fly section 48 of the ladder 24. The side rails 80 of the fly section 48 are spaced apart from one another and dimensioned to be received within the channels 64 of the slide channel members 62 of the base section 46. As such, the side rails 80 of the fly section 48 are slidable along the channels 64 of the slide channel members 62 such that the ladder 24 is extendible. The manner in which the ladder 24 is extended will be described in more detail below. Another plurality of rungs 56 is disposed between and the two side rails 80, interconnecting the two side rails 80. On its upper side, the fly section 48 has two guard rails 83 connected to the side rails 80 provided for the operator OP to hold onto while climbing the ladder 24 as a continuation of the guard rails 66 of the base section 46. A supporting member 82 is disposed at a distal end 84 of the fly section 48 for supporting the distal end 84 on a top surface 123 (FIG. 20) of the van 115 when the ladder 24 is used to climb atop the van 115. In this embodiment, the supporting member 82 comprises an angular bracket 88 having an L-shaped cross-sectional profile. As such, the angular bracket 88 can be aligned with the upper corner formed at the front longitudinal end 114 of the van 115, with both perpendicular inner surfaces of the angular bracket 88 being parallel to corresponding surfaces of the upper corner formed at the front longitudinal end 114 of the van 115. It is contemplated that the supporting member 82 may be configured differently in other embodiments and that additional supporting members may be provided in other embodiments.

For instance, in an alternative embodiment, as shown in FIGS. 16 to 19, two supporting members 82 are provided laterally spaced apart from one another at the distal end 88' of the fly section 48. In this alternative embodiment, each supporting member 82 comprises a leg 88' extending downwardly from the distal end 84 of the fly section 48.

As best shown in FIGS. 4, 5, 10 and 11, a security railing 86 is connected to the distal end 84 of the fly section 48 of the ladder 24. As will be described in greater detail below, in this embodiment, the security railing 86 is configured for attaching safety lines 30 to which the operator OP can be anchored so as to operate safely atop the van 115. The security railing 86 comprises left and right railing portions 90 that are spaced apart from one another. Notably, the left and right railing portions 90 extend in opposite directions from one another at the distal end 84 of the fly section 48. In this embodiment, each railing portion 90 comprises a vertical post 92 and a laterally-extending part 94 connected to the vertical post 92. As can be seen, the laterally-extending parts 94 of the left and right railing portions 90 extend in opposite directions from one another. It is contemplated that, in some embodiments, the vertical posts 92 could be omitted and the laterally-extending parts 94 extend from the distal end 84 of the fly section 48. As shown in FIG. 10, in this embodiment, each laterally-extending part 94 includes three horizontal members 98 extending from the corresponding vertical post 92 and an end vertical member 102 connecting the horizontal members 98. The security railing 86 may be configured differently in other embodiments. For instance, it is contemplated that, in other embodiments, the security railing 86 could be directly connected to the distal end 84 of the fly section 48.

Figure 20:
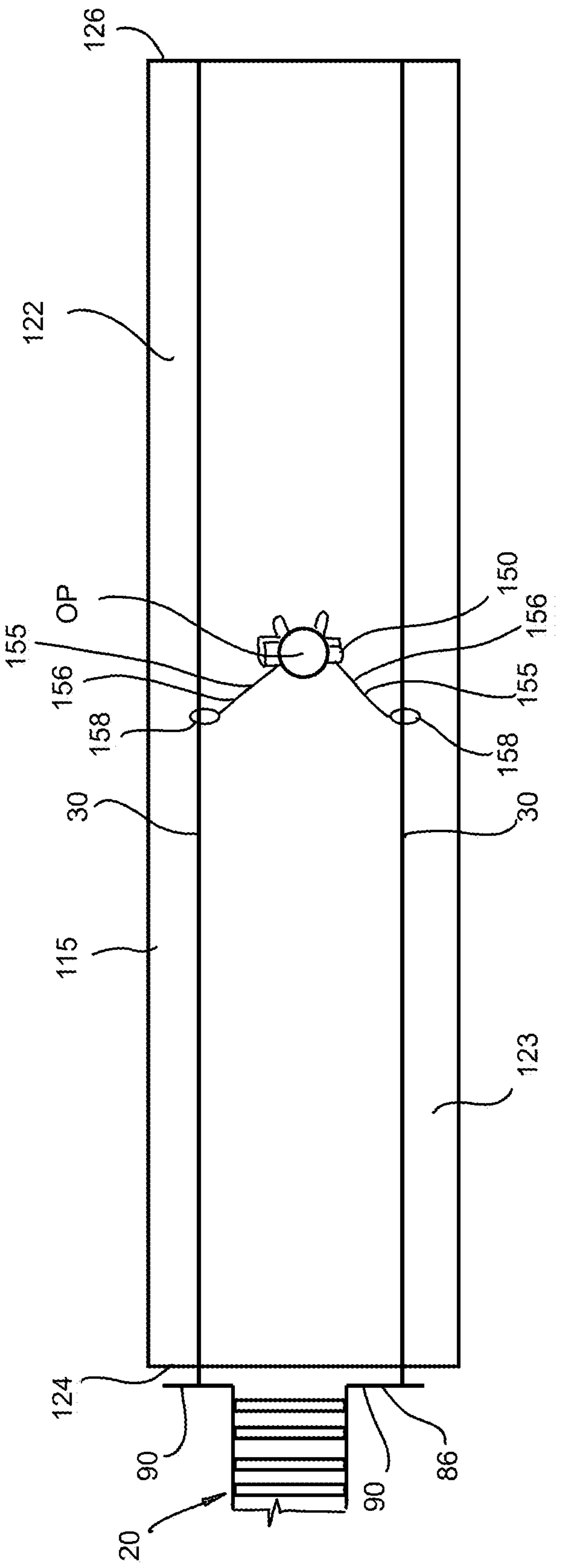
FIG. 20 is a top plan view of the safety system of FIG. 1, showing a part of the telescopic ladder system.

In order to attach the safety lines 30 to the security railing 86, the security railing 86 has two attachment points 104 (shown in FIGS. 10 and 11) for securing two safety lines 30 thereto. In particular, the security railing 86 has a left attachment point 104 and a right attachment point 104 that are spaced apart from one another. More specifically, in this embodiment, the left attachment point 104 is disposed at the left railing portion 90 and the right attachment point 104 is disposed at the right railing portion 90. In this embodiment, each attachment point 104 comprises a metallic loop 105 for attaching the safety lines 30 thereto. Notably, the loops 105 are fastened (e.g., bolted or welded) to one of the horizontal members 98 of the corresponding laterally-extending parts 94. Providing the attachment points 104 at the left and right railing portions 90 allows a greater lateral spacing therebetween, which provides more spacing between the two safety lines 30 (as shown in FIG. 20) such that the operator OP can stand therebetween easily. Nevertheless, it is contemplated that, in other embodiments, the attachment points 90 could be provided on different parts of the ladder 24. For instance, the attachment points 90 could be disposed at the fly section 48 (at the side rails 80), or at the supporting member 82. Furthermore, it is contemplated that, in alternative embodiments, a single attachment point 90 could be provided.

In alternative embodiments, as shown in FIGS. 16 to 19, the ladder 24 could also include an extension 140 disposed at the distal end 84 of the ladder 24. The extension 140 is pivotable about an axis extending laterally (i.e., parallel to the rungs 56) and can be deployed by the operator OP to walk onto the van 115 or other structure, particularly if the distal end 84 of the ladder 24 cannot get close enough thereto.

Returning now to FIGS. 2 to 4, an extension actuator 110 is disposed on the lower side 25 of the ladder 24 and is connected between the base section 46 and the fly section 48. The extension actuator 110 is configured to cause the fly section 48 to slide relative to the base section 46, namely by causing the side rails 80 of the fly section 48 to slide along the channels 64 of the slide channel members 62. In this embodiment, the extension actuator 110 is a linear actuator, and more specifically a hydraulic linear actuator. As best shown in FIG. 3, the extension actuator 110 is connected, at a proximal end thereof, to an actuator support flange 112 that is connected to the base section 46 of the ladder 24 and, at a distal end thereof, to another actuator support flange 114 that is connected to the distal end 84 of the fly section 48. The actuator support flange 112 is connected to a lower surface of a transverse support member 116 (FIG. 2) that is parallel and adjacent to the transverse support member 74. The transverse support member 116 is connected at its left and right ends to the left and right connector plates 76 respectively. The actuator support flange 114 is connected to a lower surface of a transverse support member 118 (FIGS. 2 and 4) that is elongated and extends perpendicular to the side rails 80. The transverse support member 118 is connected at its left and right ends to left and right connector plates 120 which are in turn connected to the side rails 80 such that the side rails 80 are disposed between the two connector plates 120. As can be seen in FIG. 4, the extension actuator 110 is laterally aligned with the pivot actuator 70 and is thus generally centered between the two opposite side rails 80 of the fly section 48 as well as between the two opposite side rails 54. The generally centered position of the actuator 70, 110, particularly having them positioned under the ladder 24, allows the telescopic ladder system 24 to be made more compact and thereby fit partially in the bed 14 of the pickup truck 10.

Thus, by extending and retracting the extension actuator 110, the extension actuator 110 can selectively extend and retract the ladder 24 by causing the fly section 48 to slide relative to the base section 46. By retracting the extension actuator 110 to its maximum retracted position, as shown in FIGS. 2 to 5, the ladder 24 is set to its shortest length. Contrarily, by extending the extension actuator 110 to its maximum extended position, the ladder 24 is set to its greatest length, as shown in FIGS. 13 to 15.

Figure 12:
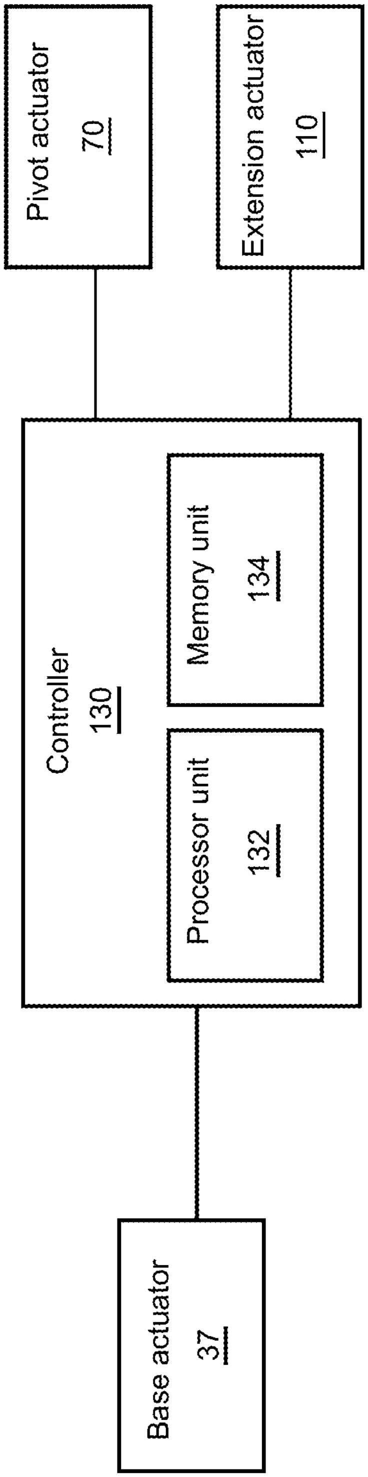
FIG. 12 is a block diagram representation of a controller of the telescopic ladder system of FIG. 2.

With reference to FIG. 12, a controller 130 is in communication with base actuator 37 and the pivot and extension actuators 70, 110. The controller 130 is thus operable to control the actuators 37, 70, 110 to selectively move the ladder 24. The controller 130 has a processor unit 132 for carrying out executable code, and a non-transitory memory unit 134 that stores the executable code in a non-transitory medium (not shown) included in the memory unit 134. The processor unit 132 includes one or more processors for performing processing operations that implement functionality of the controller 130. The processor unit 132 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory unit 134 may be a semiconductor memory (e.g., read-only memory (ROM) and/or random-access memory (RAM)), a magnetic storage medium, an optical storage medium, and/or any other suitable type of memory. While the controller 130 is represented as being one entity in this implementation, it is understood that the controller 130 could comprise separate entities for controlling components separately. In this embodiment, the controller 130 is comprised by a remote control device (not shown) that can be operated by hand with corresponding actuation controls (e.g., buttons) to control the motion of the actuators 37, 70, 110.

It is contemplated that, in other embodiments, the controller 130 could be omitted. For instance, in such embodiments, the actuators 37, 70, 110 could all be manually operated actuators. Notably, the actuators 37, 70 could be rotary crank actuators that are operated via respective cranks by an operator. The extension actuator 110 could include both a rope and a pulley to slide the fly section 48 relative to the base section 46 of the ladder 24.

Figure 21:
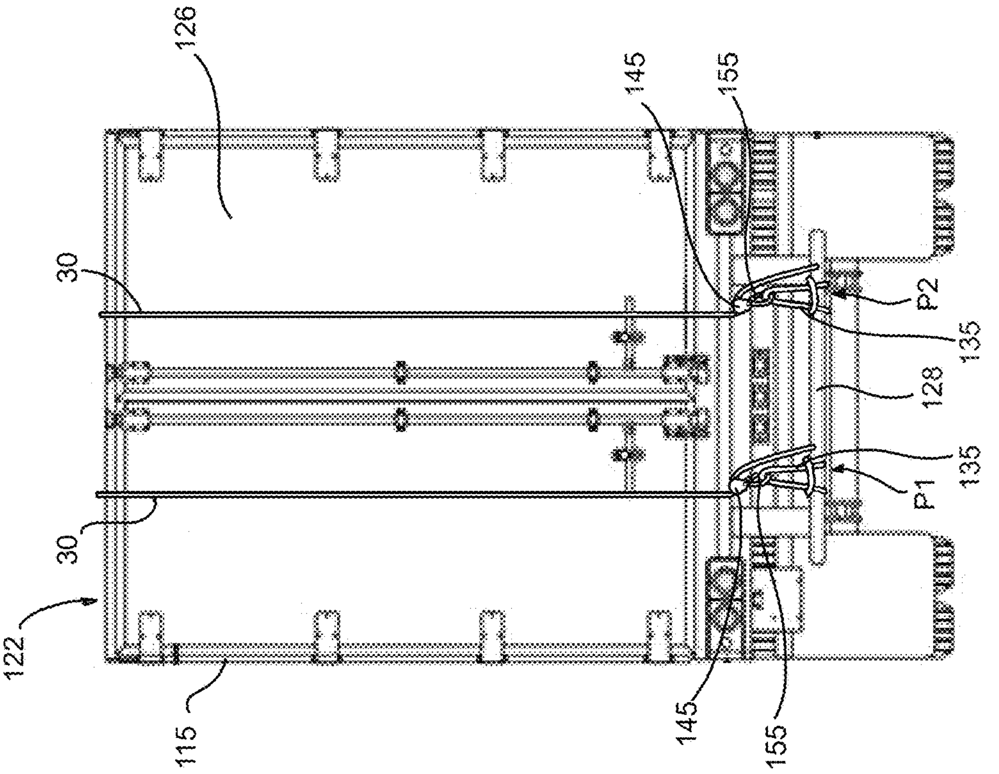
FIG. 21 is a rear elevation view of the van of the safety system of FIG. 1.

With reference now to FIGS. 1, 20 and 21, the manner in which the safety system 100 is setup to secure the operator OP atop the van 115 will be described herein. First, as shown in FIG. 1, the pickup truck 10 is positioned in a vicinity of the van 115, namely at the front longitudinal end 124 thereof. As can be seen, due to the positioning of the telescopic ladder system 20 in the bed 14 of the pickup truck 10, the pickup truck 10 is positioned with its rear end facing the front longitudinal end 124 of the van 115. Before or after positioning the pickup truck 10, the ladder 24 is extended approximately to a height of the roof 122 of the van 115 at the front longitudinal end 124 thereof. The distal end 52 of the ladder 24 is supported on the top surface 123 of the van 115 at the front longitudinal end 124 to allow the operator OP to climb atop the van 115.

Next, the two safety lines 30 are unrolled from the reels 75 and are attached, at one end, to the ladder 24, namely to the attachment points 104 thereof. At their opposite ends, the safety lines 30 are attached to the rear longitudinal end 126 of the van 115. More specifically, as shown in FIG. 21, the two safety lines 30 are attached to a bumper 128 of the van 115 at the rear longitudinal end 126. The two safety lines 30 are attached to the bumper 128 at two different points P1, P2 that are laterally spaced from one another. By maintaining this lateral distance between the two safety lines 30, the safety lines 30 are made to extend generally parallel to one another (see FIG. 20) which, as mentioned above, can facilitate the displacement of the operator OP atop the van 115. In particular, two slings 135 are connected to the bumper 128 at the two different points P1, P2 to attach the safety lines 30 thereto. The two slings 135 are looped around the bumper 128 to form a secure connection with the bumper 128 (e.g., using a cow hitch knot). The safety lines 30 are attached to the slings 135 via corresponding line tightening devices 145 and carabiners 155. Notably, as can be seen in FIG. 21, each safety line 30 is engaged by a corresponding line tightening device 145 which is connected to a corresponding carabiner 155. In this embodiment, the line tightening devices 145 are rope adjusters which are lockable on the corresponding safety line 30. The carabiners 155 are thus hooked onto the slings 135 to attach the safety lines 30 to the bumper 128. The safety lines 30 are then tightened via the line tightening devices 145 by pulling on a loose end of each safety line 30 (i.e., the end of the safety line 30 at the rear longitudinal end 126 of the van 115). This removes some of the slack of the safety lines 30, particularly at the rear longitudinal end 126 of the van 115.

Next, the safety lines 30 are further tightened by moving the ladder 24 relative to the pickup truck 114. To that end, in this embodiment, the inclination angle θ of the ladder 24 is adjusted by actuating the pivot actuator 70 to change the angular orientation of the ladder 24 relative to the pickup truck 10. In particular, the inclination angle θ is increased such that that the ladder 24 is oriented to be more upright (i.e., vertical). This pulls the attachment points 104 away from the front longitudinal end 124 to tighten the safety lines 30.

Before or after the safety lines 30 are tightened, the operator OP can be secured thereto. In particular, as shown in FIGS. 1 and 20, with the operator OP standing between the two safety lines 30, a security harness 150 worn by the operator OP is attached thereto. Notably, two links 155 are attached between the security harness 150 and the corresponding safety lines 30. Each link 155 comprises a safety lanyard 156 connected to the security harness 150 (e.g., via a snap hook) and a hook 158 for connection to a corresponding safety line 30. In this embodiment, the hooks 158 are tower hooks. Other types of hooks are contemplated in other embodiments (e.g., carabiners, etc.). Once the hooks 158 engaged the safety lines 30, the security harness 150, and thereby the operator OP, is restricted within a range of lateral movement relative to the van 115 by the links 155. However, the security harness 150 is free to be moved longitudinally along the van 115 as the hooks 158 slide along the safety lines 30. This allows the operator OP to move freely longitudinally along the van 115. In this example, the operator OP can thus clear snow from the roof 122 of the van 115 along the entire length of the van 115 while securely attached to the safety lines 30 to prevent an accidental fall from the van that could otherwise be caused by a misstep or a gust of wind.

In order to detach the operator OP from the safety system 30, the distal end 84 of the ladder 24 is lowered back down to the position in which it is supported by the roof 122 to thereby loosen the safety lines 30. The ends of the safety lines 30 are detached from their respective anchoring points and they are rolled back onto the reels 75. The operator OP climbs back down the ladder 24 and the ladder 24 is retracted and lowered. If, in order to climb atop the van 115, the upper base portion 18 of the telescopic ladder system 20 was pivoted about the axis 35 to a position other than the locked position of the upper base portion 18, the ladder 24 is pivoted back to the locked position (with the ladder 24 disposed centrally relative to the pickup truck 10 and the distal end 84 thereof being positioned longitudinally rearward). The pickup truck 10 is then ready to be driven on roads.

As can be understood from the above, the pickup truck 10 equipped with the telescopic ladder system 20 provides a convenient, compact and safe solution for climbing and operating atop vans. In addition, it is a more affordable solution than conventional scraper systems used for clearing snow from vans which can be prohibitively expensive, particularly if only a small or medium sized fleet of vans needs to be maintained. Moreover, the pickup truck 10 is a road vehicle (i.e., a vehicle that can be used on roads) and therefore can travel between job sites which can be useful for a contractor that has many fleets of vans to maintain for multiple clients. This is in contrast for example to certain conventional van cleaning solutions which involve the use of forklifts or other powered industrial trucks to reach the top of the van.

It is contemplated that the pickup truck 10 equipped with the telescopic ladder system 20 may be useful in other applications other than the maintenance of vans. For instance, in some cases, the pickup truck 10 equipped with the telescopic ladder system 20 may be useful for the operator OP to climb atop structures other than a van. This can include for example sheds and other structures.

Furthermore, the safety system 100 and the manner in which its components are operated to secure the operator OP atop the van 115 could be useful in the maintenance of vehicles such as cube trucks, school buses or other such vehicles having a substantial height and for which it could be useful to climb onto for maintenance thereof.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A method for securing an operator atop one of a vehicle and a van, the method comprising:

positioning an operating vehicle in a vicinity of the one of the vehicle and the van, the operating vehicle comprising a telescopic ladder system configured to be used by the operator to climb atop the one of the vehicle and the van;

extending a ladder of the telescopic ladder system approximately to a height of a top of the one of the vehicle and the van at a first longitudinal end of the one of the vehicle and the van;

supporting a distal end of the ladder on a top surface of the one of the vehicle and the van at the first longitudinal end thereof to allow the operator to climb atop the one of the vehicle and the van;

attaching at least one safety line to the ladder;

attaching the at least one safety line to a second longitudinal end of the one of the vehicle and the van;

tightening the at least one safety line by moving the ladder relative to the operating vehicle; and attaching a security harness configured to be worn by the operator to the at least one safety line.

2. The method of claim 1, further comprising, prior to tightening the at least one safety line by moving the ladder, tightening the at least one safety line via a corresponding line tightening device engaging the at least one safety line at the second longitudinal end of the one of the vehicle and the van.

3. The method of claim 1, wherein tightening the at least one safety line by moving the ladder relative to the operating vehicle comprises changing an angular orientation of the ladder relative to the operating vehicle.

4. The method of claim 3, wherein changing the angular orientation of the ladder relative to the operating vehicle comprises increasing an angle defined between the ladder and a lower base of the telescopic ladder system so that the ladder is oriented to be more upright.

5. The method of claim 1, wherein attaching the at least one safety line to the second longitudinal end of the one of the vehicle and the van comprises:

attaching the at least one safety line to a bumper of the one of the vehicle and the van at the second longitudinal end of the one of the vehicle and the van.

6. The method of claim 5, wherein:

the at least one safety line comprises a first safety line and a second safety line;

the telescopic ladder system comprises a security railing disposed at the distal end of the ladder;

the security railing comprises a first railing portion and a second railing portion extending in opposite directions from one another at the distal end of the ladder;

attaching the at least one safety line to the ladder comprises:

attaching the first safety line to the first railing portion;

attaching the second safety line to the second railing portion; and attaching the at least one safety line to the bumper of the one of the vehicle and the van comprises:

attaching the first safety line to the bumper of the one of the vehicle and the van at a first point of the bumper;

attaching the second safety line to the bumper of the one of the vehicle and the van at a second point of the bumper laterally spaced apart from the first point of the bumper such that the first and second safety lines are generally parallel to one another.

7. The method of claim 6, wherein attaching the security harness to the at least one safety line comprises:

attaching a first link to the first safety line and to the security harness; and attaching a second link to the second safety line and to the security harness, the security harness being restricted within a range of lateral movement relative to the one of the vehicle and the van by the first and second links.

8. The method of claim 7, wherein:

attaching the first link to the first safety line comprises attaching a first hook of the first link to the first safety line;

attaching the second link to the second safety line comprises attaching a second hook of the second link to the second safety line; and the security harness is free to be moved longitudinally along the one of the vehicle and the van as the first and second hooks slide along the first and second safety lines.

* * * * *